US012683040B2

(12) United States Patent
Hilsenbeck et al.

(10) Patent No.: US 12,683,040 B2
(45) Date of Patent: Jul. 14, 2026

(54) CABLE

(71) Applicant: Lapp Engineering AG, Cham (CH)

(72) Inventors: Stefan Hilsenbeck, Steinenbronn (DE); Werner Körner, Berlin (DE)

(73) Assignee: LAPP ENGINEERING AG, Cham (CH)

( * ) Notice: Subject to any disclaimer, the term of this patent is extended or adjusted under 35 U.S.C. 154(b) by 150 days.

(21) Appl. No.: 18/574,851

(22) PCT Filed: Jun. 24, 2022

(86) PCT No.: PCT/EP2022/067406
§ 371 (c)(1),
(2) Date: Dec. 28, 2023

(87) PCT Pub. No.: WO2023/274886
PCT Pub. Date: Jan. 5, 2023

(65) Prior Publication Data

US 2024/0304360 A1 Sep. 12, 2024

(30) Foreign Application Priority Data

Jun. 28, 2021 (DE) ..................... 10 2021 116 629.2

(51) Int. Cl.
*H01B 9/02* (2006.01)
*H01B 9/00* (2006.01)

(52) U.S. Cl.
CPC ............. *H01B 9/025* (2013.01); *H01B 9/006* (2013.01)

(58) Field of Classification Search
CPC .......... H01B 7/04; H01B 7/0045; H01B 7/17; H01B 9/003
See application file for complete search history.

(56) References Cited

U.S. PATENT DOCUMENTS

| | | | | |
|---|---|---|---|---|
| 5,486,649 A | | 1/1996 | Gareis | |
| 5,491,299 A | * | 2/1996 | Naylor .................. | A61B 5/303 174/105 R |
| 5,834,698 A | * | 11/1998 | Izui ........................ | H01B 9/003 174/117 F |
| 8,471,149 B2 | * | 6/2013 | Huynh .................. | H01B 7/048 174/105 R |

(Continued)

FOREIGN PATENT DOCUMENTS

| | | |
|---|---|---|
| CN | 203721333 U | 4/2014 |
| CN | 109585092 A | 4/2019 |

(Continued)

OTHER PUBLICATIONS

DE Search Report for corresponding DE Application No. 10 2021 116 629.2, dated Mar. 8, 2022, 10 pgs.

(Continued)

*Primary Examiner* — Chau N Nguyen
(74) *Attorney, Agent, or Firm* — Tarolli, Sundheim, Covell & Tummino LLP

(57) ABSTRACT

A cable, in particular a cable for the at least partial transmission of electrical energy, comprising several, in particular three, phase cores and at least one further core, in particular a protective core, is proposed, wherein the several phase cores are stranded to form at least one phase bundle and the at least one further core runs outside the at least one phase bundle in the cable.

13 Claims, 9 Drawing Sheets

(56) References Cited

U.S. PATENT DOCUMENTS

Figure 1:
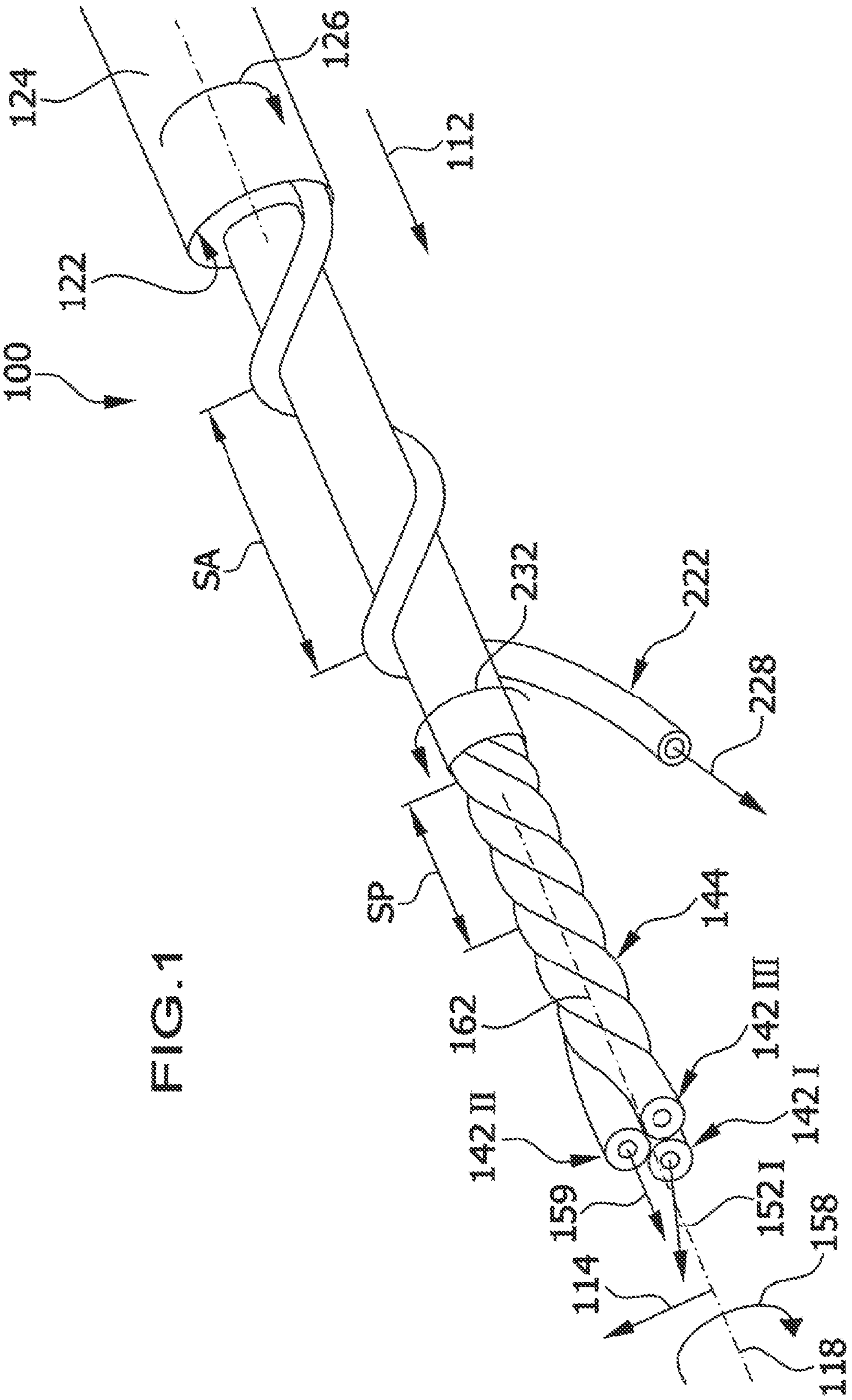

| | | | | |
|---|---|---|---|---|
| 8,907,211 | B2 | 12/2014 | Fox et al. | |
| 9,018,529 | B2 | 4/2015 | Sidlyarevich | |
| 2002/0117325 | A1 | 8/2002 | Mennone et al. | |
| 2010/0227764 | A1 * | 9/2010 | Willen | H01B 12/16 505/231 |
| 2011/0088926 | A1 * | 4/2011 | Grogl | H01B 11/1091 174/107 |
| 2012/0103646 | A1 | 5/2012 | Fox et al. | |
| 2015/0107874 | A1 | 4/2015 | Green et al. | |
| 2016/0020002 | A1 | 1/2016 | Feng | |
| 2017/0309371 | A1 | 10/2017 | Schropp | |
| 2017/0361789 | A1 | 12/2017 | Ohgushi et al. | |

FOREIGN PATENT DOCUMENTS

| | | | |
|---|---|---|---|
| CN | 210325302 | U | 4/2020 |
| DE | 102005010728 | A1 | 10/2005 |
| EP | 2148336 | B1 | 1/2010 |
| EP | 2027589 | B1 | 9/2011 |
| EP | 3279901 | A1 | 2/2018 |
| JP | 2003297151 | A | 10/2003 |

OTHER PUBLICATIONS

International Search Report and Written Opinion for corresponding PCT/EP2022/067406, dated Sep. 23, 2022, pp. 1-16.

* cited by examiner

CABLE

CROSS-REFERENCE TO RELATED APPLICATIONS

The present invention is a U.S. National Stage under 35 USC 371 patent application, claiming priority to Serial No. PCT/EP2022/067406, filed on 24 Jun. 2022, which claims priority from DE 10 2021 116 629.2, filed 28 Jun. 2021, the entirety of both of which are incorporated herein by reference.

The invention relates to a cable, in particular a cable for the at least partial transmission of electrical energy. The cable comprises multiple, for example three, phase cores, which in particular each comprise a phase conductor and are advantageously designed to transmit one phase of an electric current. The cable comprises at least one further core, which in particular has a conductor, wherein the at least one further core is in particular a protective core with a protective conductor, for example for earthing and/or potential equalization.

The object underlying the invention is to improve a cable.

According to one embodiment of the invention, this task is solved in a cable comprising multiple phase cores and at least one further core in that the phase cores are stranded to form at least one phase bundle and the at least one further core runs outside the at least one phase bundle in the cable.

A particular advantage of the invention is that the at least one further core runs separately from the phase bundle of the phase cores in the cable, thus reducing in particular capacitive and/or inductive coupling between the phase cores and the at least one further core.

In particular, the decoupling at least reduces unwanted currents in the conductor of the at least one further core, so that, for example, legal and/or other regulatory requirements can at least be better complied with and/or, for example, a greater usable maximum cable length is made possible.

Preferably, by stranding the phase cores to form a phase bundle, interference on the at least one further core and/or on shields in the cable is reduced.

In particular, the reduction in interference coupling caused by the structure of the cable interior means that more cost-effective insulation materials can be used, especially for the other cores, and/or shielding of the cable interior to the outside and/or shielding within the cable interior can be reduced or dispensed with altogether, so that the cable can preferably be manufactured more simply and cost-effectively.

In particular, the cable is designed to supply three-phase electric motors, especially for synchronous drives and/or asynchronous drives, and is suited for this purpose.

For example, in the case of pulsed currents, for example in the control of frequency converter-controlled motors, the pulsed control causes interference currents in other cores of the cable, for example in the range from approx. 3 kHz to 50 kHz, so that the cable according to the invention is advantageous for such applications, for example, since the coupling between the current-transmitting phase cores and the other cores and/or the coupling between the current-transmitting phase cores and a shield is at least reduced.

In particular, at least lower interference currents are induced in the conductors of the other cores of the cable and/or in shields in the cable due to the lower coupling, so that, for example, lower currents flow towards earth potential and/or housing parts connected to the cores and/or connected to a shield are protected and, for example, the risk of spark erosion and/or other damage to electrically conductive parts, for example drive shafts and/or ball bearings of motors, is at least reduced.

For example, the reduction of interference coupling in the cable, for example in the protective conductor, increases grid stability in grids in which the cable is used.

Preferably, when using the cable, for example in networks and/or machines, protective devices, in particular filters and/or fault protection switches, can be used at least to a reduced extent, as interference coupling is at least reduced with the cable.

In particular, the cable according to the invention also enables improved data communication, for example, as interference is reduced to one signal conductor.

In particular, interference coupling of the cable to neighboring cables, for example a data line, is at least reduced, for example because at least lower interference currents occur in earth conductors and, for example, at least lower interference currents in shields of the neighboring cables flow towards earth potential. Interference currents and/or circulating currents in earth loops are therefore avoided or at least reduced.

With regard to advantageous arrangements of the at least one further core and/or the phase cores, no further details have been provided so far.

In particular, only phase cores are stranded in the at least one phase bundle.

In particular, phase cores are cores whose conductors are intended and designed as phase conductors for transmitting electrical energy, in particular a phase of an electric current.

For example, the respective phase conductor of a phase core is intended for power transmission in 230 V or 400 V grids and/or in three-phase grids.

In favorable embodiments, the respective phase conductor of a phase core is designed for voltages up to the kV range, in particular for voltages of up to 6 kV, for example up to 1 kV.

Advantageously, the multiple phase cores, in particular the three phase cores, of the phase bundle are arranged at least electrically symmetrically in the phase bundle, in particular with respect to a phase bundle axis, preferably symmetrically wound around the phase bundle axis.

In particular, the multiple phase conductors are arranged symmetrically in the phase bundle in such a way that, in a cross-section perpendicular to a longitudinal direction of the phase bundle, the respective phase conductors of the multiple phase cores in the phase bundle, in particular their conductor centers, are arranged at a respective corner of an imaginary geometric, equilateral polygon.

In particular, a phase conductor of one of the multiple phase cores is arranged at each corner of the imaginary, geometric equilateral polygon.

In particular, the respective phase conductors, especially their conductor centers, are arranged at a respective corner of an imaginary, geometric equilateral triangle in the case of three phase cores in the phase bundle.

In particular, the three phase cores in the phase bundle are arranged symmetrically in such a way that for one phase core an angle at which two respective geometric connecting lines from the phase conductor of this phase core to the phase conductors of the two adjacent phase cores intersect is the same for each of the phase cores. In particular, in embodiments in which three phase cores are stranded to form the phase bundle, this angle is at least approximately 60°.

Advantageously, the several, for example three, phase cores in the phase bundle are arranged symmetrically in such a way that a radial distance between the respective phase conductors of the phase cores and a phase bundle axis is the same for each of the phase cores and in particular along the longitudinal extent of the phase bundle.

In some embodiments, it is provided that the cable comprises several phase bundles in which phase cores are stranded.

Preferably, the multiple phase bundles are stranded symmetrically to each other.

In particularly advantageous embodiments, it is provided that the at least one phase bundle is the only phase bundle with phase cores in the cable.

For example, this simplifies the structure of the cable.

In particular, with a single phase bundle, a symmetrical, in particular at least electrically symmetrical, structure can be achieved inside the cable with regard to the arrangement of the phase cores and preferably an associated reduction in interference couplings, in particular inductive interference couplings.

It is particularly advantageous if the at least one further core is wound around the at least one phase bundle of the multiple phase cores.

For example, all further cores in the cable are wound around the at least one phase bundle of the multiple phase cores.

In particular, this achieves a compact structure of the cable interior.

It is particularly advantageous if the at least one further core does not run parallel to each of the multiple phase cores.

In some favorable embodiments, the at least one further core, in particular some, for example all, further cores are wound around the phase bundle with a direction of lay corresponding to the direction of lay of the multiple phase cores in the phase bundle, in particular stranded with the phase bundle.

It is particularly advantageous if the at least one further core, in particular some, for example all of the further cores in the cable, is/are wound around the phase bundle with a direction of lay that is opposite to the direction of lay of the multiple phase cores in the at least one phase bundle.

In particular, thus the at least one further core, for example all further cores, and the multiple phase cores in the phase bundle are stranded in the opposite winding direction.

In particular, this ensures that points at which a phase core and at least one further core are arranged close to each other are reduced, thereby also reducing interference coupling.

In particular, the counter stranding of the multiple phase cores and the at least one further core, preferably the multiple, for example all, further cores, achieves an at least electrically symmetrical arrangement of the further cores relative to the phase cores, which advantageously at least reduces an especially inductive interference coupling of the phase cores to the further cores, since in particular the interference caused by destructive interference is reduced or even at least approximately eliminated.

In particular, the multiple phase cores are stranded with a lay length SP in the phase bundle.

For example, the lay length SP of the multiple phase cores in the phase bundle is greater than or equal to 10 mm.

In particular, the lay length SP of the multiple phase cores in the phase bundle is less than or equal to 1,000 mm, for example less than or equal to 500 mm.

In particular, the lay length SP of the multiple phase cores in the phase bundle is selected depending on the cross-section of the phase cores and/or the requirements for the cable, for example with regard to the bendability of the cable.

In particular, the at least one further core with a lay length SA is wound around the phase bundle, in particular stranded.

Advantageously, all cable elements which are wound around the phase bundle in one layer with the at least one further core, in particular stranded with it, are wound around the phase bundle with the same lay length SA as the at least one further core, in particular stranded with it.

In particular, the one further cable element or the multiple further cable elements is a single further core and/or are multiple individual cores and/or a stranded bundles consisting of multiple cores and/or multiple stranded bundles each consisting of several cores.

In some advantageous embodiments, the at least one further core is a core of a stranded bundle which runs outside the at least one phase bundle in the cable, in particular is wound around the at least one phase bundle, in particular is stranded with it.

In preferred embodiments, it is provided that the at least one further core runs as a single core outside the at least one phase bundle in the cable and in particular is wound as a single core around the at least one phase bundle, in particular is stranded with the phase bundle.

Preferably, the lay length SA, with which the at least one further core, in particular as a single core or as part of a stranded bundles, is wound around the at least one phase bundle, is less than or equal to 2,000 mm, for example less than or equal to 1,000 mm.

In particular, the lay length with which the at least one further core, in particular as a single core or as part of a stranded bundle, is wound around the at least one phase bundle is greater than or equal to 10 mm, for example greater than or equal to 40 mm.

The lay length SA with which the at least one further core is wound around the at least one phase bundle is selected in particular with regard to the design of the at least one further core and/or its arrangement and/or the requirements on the cable.

In particular, the lay length SA of the at least one further core is selected as a function of the lay length SP of the phase cores in the phase bundle.

In advantageous embodiments, it is provided that an absolute value $|SP/SA|$ of a lay length ratio of the lay length SP of the multiple phase cores in the phase bundle to the lay length SA of the at least one further core, with which the at least one further core is wound around the phase bundle, is greater than or equal to 0.1, since otherwise, for example, a lay length of the further core would be too long and the cable would not be flexible enough and would, for example, have a shorter service life in dynamic, moving applications.

In preferred embodiments, it is provided that an absolute value $|SP/SA|$ of the lay length ratio of the lay length SP of the multiple phase cores in the phase bundle to the lay length SA of the at least one further core, with which the at least one further core is wound around the phase bundle, is less than or equal to 3. This means, for example, that the material used for the at least one further core and thus, in particular, the costs and/or weight of the cable are not excessively increased by the stranding of the at least one further core around the phase bundle.

In particular, the lay length ratio SP/SA of the lay length SP of the multiple phase cores in the phase bundle to the lay length SA of the at least one further core with which the at least one further core is wound around the phase bundle is negative when the at least one further core is stranded in the opposite direction to the stranding of the phase cores in the phase bundle, and the lay length ratio SP/SA is positive when the phase cores in the phase bundle and the at least one further core around the phase bundle are stranded in the same direction.

Thus, in preferred embodiments, the lay length ratio SP/SA is in the range from including −0.1 up to and including −3.

Alternatively or additionally, the task mentioned at the beginning is solved in a cable which comprises multiple, in particular three, phase cores and at least one further core, in that the at least one further core is arranged in the cable in such a way that the at least one further core crosses at least one of the multiple phase cores at crossing points.

Preferably, the at least one further core is arranged in the cable in such a way that the at least one further core crosses each of the multiple phase cores in the phase bundle, for example all phase cores in the cable, at respective crossing points.

In particular, this ensures that the at least one further core only comes close to the at least one phase core or each of the multiple phase cores in a way that enables strong coupling at crossing points, thus reducing overall coupling, which can cause interference, between the at least one further core and the phase cores.

For further advantages of the reduced coupling, please refer to the above explanations in full.

It is particularly advantageous if at least some, preferably all, of further cable elements, which are in particular individual cores or stranded bundles of cores, are arranged in the cable in such a way that these cable elements cross at least one of the multiple phase cores, in particular each of the multiple phase cores in the phase bundle, for example all phase cores in the cable, at respective crossing points.

In particular, such an intersecting arrangement of the at least one further core and/or the further cable elements is made possible by stranding as explained above.

In particular, it is provided that the at least one further core and, for example, the one further cable element or the further cable elements, cross a phase core at a crossing angle at a respective crossing point.

It is preferable that the crossing angle is less than or equal to 65°.

In particular, this enables a compact structure of the cable and/or does not excessively increase the amount of material required for the cores and thus, in particular, the weight and/or costs of the cable.

Preferably, it is provided that the crossing angle, in particular in the case of a counter stranding and/or equal stranding of the at least one further core relative to the phase cores, is less than or equal to 60°, for example less than or equal to 55°.

For example, in some favorable embodiments, in particular where the at least one further core is stranded in the same direction relative to the phase cores, it is provided that the crossing angle is less than or equal to 30°.

It is preferable that the crossing angle is greater than or equal to 5°, in particular greater than or equal to 10°. In particular, this ensures that the at least one further core and/or the one further cable element or the further cable elements run at a sufficient angle to the phase cores, thus minimizing coupling.

Alternatively or additionally, in embodiments of the invention, the task mentioned at the beginning is also solved by a cable comprising a plurality of, in particular three, phase cores and at least one further core, the cable having an inner layer lying on the inside with respect to a transverse direction of the cable extending perpendicularly to a longitudinal direction of the cable and at least one outer layer which is arranged further outside with respect to the transverse direction than the inner layer, in particular in a cable interior of the cable, which is arranged further outside than the inner layer with respect to the transverse direction, in particular in a cable interior of the cable, and the plurality of phase cores are arranged in the inner layer and the at least one further core is arranged in the at least one outer layer.

In particular, this ensures that the at least one further core is arranged further away from the phase cores in the inner layer due to the spatial separation in the outer layer relative to the inner layer and thus interference coupling caused by the phase cores in the at least one further core is at least reduced.

With regard to further advantages of the spatial separation of the at least one further core from the phase cores and the advantageously associated reduced coupling, reference is made in full to the above explanations.

In particular, it is intended that only phase cores, i.e. in particular cores with phase conductors, which are designed and intended for the transmission of electrical energy, in particular as explained above, for example at voltages greater than 200 V, are arranged in the inner layer of the cable.

Advantageously, this ensures that no cores other than phase cores are arranged in the inner layer, thus reducing interference coupling from phase cores to other cores.

In particularly advantageous embodiments, it is provided that all phase cores of the cable are arranged in the inner layer.

In particular, this ensures that phase cores are only arranged in the inner layer, thus at least reducing their interference with other cores, especially in the at least one outer layer.

It is particularly advantageous if the multiple phase cores in the inner layer are stranded to form at least one, for example a single, phase bundle.

Preferably, the at least one phase bundle in the inner layer has one or more of the features explained above in connection with the phase bundle.

In particular, the at least one phase bundle described above is arranged in the inner layer.

In particular, the inner layer, especially in relation to the transverse direction of the cable, is the layer furthest inside the cable.

In preferred embodiments, it is provided that additional cores that are not phase cores are arranged outside the inner layer in a cable interior of the cable, in particular in relation to the transverse direction.

It is advantageous, for example, that the additional cores are not arranged together with the phase cores in the inner layer but outside the inner layer, thus at least reducing interference coupling by the phase cores in the additional cores.

The additional cores are, for example, individual cores or parts of cable elements, in particular parts of stranded bundles, consisting of, for example, two cores, as described in particular above and below with further advantageous features.

In particular, the additional cores are arranged in the at least one outer layer, for example as individual cores or parts of cable elements, in particular parts of stranded Bundles.

In some favorable embodiments, the cable has several outer layers. In other advantageous embodiments, the at least one outer layer is the only outer layer of the cable.

Alternatively or additionally, in preferred embodiments of the invention, the task mentioned at the beginning is also solved by the fact that in a cable comprising multiple, in particular three, phase cores and at least one further core, the cable is at least electrically symmetrical with respect to at least one, in particular capacitive and/or inductive, coupling of the multiple phase cores to one another. Preferably, therefore, a particularly capacitive and/or inductive coupling between two of the multiple phase cores is at least approximately equal.

Alternatively or additionally, in preferred embodiments of the invention, the above-mentioned problem is also solved by a cable comprising a plurality of phase cores, in particular three phase cores, and at least one further cores, wherein the cable is at least electrically symmetrical at least with respect to a respective, in particular capacitive and/or inductive, coupling of the at least one further core each with one of the multiple phase cores.

Advantageously, the couplings, in particular capacitive and/or inductive couplings, between the at least one further core and one of the multiple phase cores are at least approximately the same size.

In particular, the especially capacitive and/or inductive coupling between the at least one further core and one of the multiple phase cores is at least approximately the same size as a corresponding, i.e. especially capacitive and/or inductive, coupling between the at least one further core and another of the multiple phase cores.

Preferably, the at least electrically symmetrical arrangement ensures that an excessively large coupling between at least one phase core and the at least one further core is avoided and, advantageously, the multiple couplings between the multiple phase cores to the at least one further core are reduced.

Advantageously, with the at least electrically symmetrical design, the inductive interferences of the phase cores on the at least one further core interfere destructively, so that these interferences are at least reduced, for example at least approximately eliminated.

Advantageously, the cable is designed to be at least electrically symmetrical in such a way that the capacitive and/or inductive couplings between a core in the inner layer, i.e. in particular a phase core, and a core in the outer layer, which is in particular a protective core and/or signal transmission core, but in particular not a phase core, are at least approximately equal.

In particular, the cable is designed to be at least electrically symmetrical in such a way that the capacitive and/or inductive coupling between one phase core and one further core, which is for example a protective core and/or a signal core, is at least approximately the same.

Advantageously, the structure of the cable is at least electrically symmetrical in such a way that the coupling, in particular capacitive and/or inductive coupling, between each additional cable element, which is a single core and/or a stranded bundle, and each phase core is at least approximately the same size.

No further details have yet been provided regarding other cable designs.

In advantageous embodiments, it is provided that a separating layer is arranged between the multiple phase cores, which are stranded in particular to form the phase bundle, and the at least one further core.

Advantageously, it is provided that, in particular in relation to the transverse direction of the cable, all phase cores of the cable are surrounded by the separating layer, and further cable elements, i.e. in particular individual cores and/or stranded bundles, with, for example, signal cores and/or protective cores, are arranged outside an area surrounded by the separating layer.

Advantageously, the fact that the separating layer is arranged between the at least one further core and the phase cores further reduces at least capacitive coupling between them.

In particular, the separating layer extends in the longitudinal direction of the cable along at least approximately the entire longitudinal length of the cable and is closed on the circumference, so that the separating layer surrounds an inner area, particularly in relation to the transverse direction of the cable.

Preferably, the separating layer is arranged between the inner layer and the outer layer.

In particular, the separating layer is made of a separating layer material.

Preferably, the separating layer material has an effective permittivity that is less than or equal to 3, preferably less than or equal to 2.3.

In particular, the effective permittivity of the separating layer material is measured in a frequency range of 100 Hz or greater and/or 2 MHz or less.

Advantageously, the separating layer material is an insulating material.

In particular, the separating layer material is a plastic.

It is particularly advantageous if the separating layer has many air inclusions, especially in the separating layer material, which in particular reduces the coupling between cores, especially phase cores, on one side of the separating layer and other cores, especially protective cores and/or signal cores, on the other side of the separating layer.

In advantageous embodiments, the separating layer is formed from a woven and/or knitted and/or braided fabric, in particular from a fleece.

In favorable embodiments, the separating layer is formed from a tape, in particular a woven and/or knitted and/or braided tape, advantageously a tape with many air inclusions.

In favorable embodiments, the inner layer is surrounded by a transverse bandaged tape.

In other advantageous embodiments, the inner layer is surrounded by a longitudinally running-in bandaged tape.

In particular, a thickness of the separating layer measured in the transverse direction perpendicular to the longitudinal direction of the cable is greater than or equal to 0.01 mm, preferably greater than or equal to 0.02 mm.

Preferably, the thickness of the separating layer measured in the transverse direction perpendicular to the longitudinal direction of the cable is less than or equal to 1.5 mm, in particular less than or equal to 0.8 mm.

In particularly advantageous embodiments, it is provided that the thickness of the separating layer measured in the transverse direction perpendicular to the longitudinal direction of the cable is at least approximately 0.1 mm, for example 0.1 mm+/−50%, for example 0.1 mm+/−20%.

In some advantageous embodiments, it is provided that the cable comprises a shielding layer.

Alternatively or additionally, in preferred embodiments of the invention, the above-mentioned problem is also solved by a cable comprising a plurality of phase cores, in particular three phase cores, and at least one shielding layer, wherein the cable is at least electrically symmetrical at least with respect to a respective, in particular capacitive and/or inductive, coupling of the at least one shielding layer with in each case one of the multiple phase cores.

Advantageously, the couplings, in particular capacitive and/or inductive couplings, between the at least one shielding layer and in each case one of the multiple phase cores are at least approximately the same size.

In particular, the especially capacitive and/or inductive coupling between the at least one shielding layer and one of the multiple phase cores is at least approximately the same size as a corresponding, i.e. especially capacitive and/or inductive, coupling between the at least one shielding layer and another of the multiple phase cores.

In particular, the shielding layer is designed and intended to shield the cable interior from the environment and vice versa, thereby improving the electromagnetic compatibility of the cable.

In particular, the shielding layer extends in the longitudinal direction of the cable along at least approximately the entire longitudinal extent of the cable and is designed to be closed on the circumference, so that at least a part of the cable interior, preferably the entire cable interior, is surrounded by the shielding layer, in particular with respect to the transverse direction of the cable.

In particular, it is provided that the shielding layer is arranged outside the multiple phase cores and the at least one further core around these cores in relation to the transverse direction perpendicular to the longitudinal direction of the cable.

In particular, it is intended that the shielding layer is arranged around all the cores of the cable.

Preferably, the shielding layer is arranged around a cable interior, in particular the cores in the cable, in such a way that the cores and/or the cable interior are arranged within the shielding layer as in a Faraday cage.

In particular, the shielding layer is made of an electrically conductive, especially metallic material.

Advantageously, the shielding layer is arranged in the transverse direction perpendicular to the longitudinal direction of the cable outside the outer layer around the latter, in particular in a circumferential direction, for example relative to the longitudinal direction and/or a cable axis of the cable around the outer layer.

In particular, the cable has a sheath.

In particular, the sheath extends in the longitudinal direction of the cable along at least approximately the entire longitudinal length of the cable.

In particular, the sheath is arranged in an outer area of the cable in relation to the transverse direction perpendicular to the longitudinal direction of the cable.

In particular, the sheath forms an outer side of the cable, especially in relation to the transverse direction of the cable.

Preferably, the sheath is closed in relation to a circumferential direction of the cable, in particular relative to the longitudinal direction and/or around a cable axis of the cable.

Advantageously, the sheath encloses the inside of the cable.

In particular, in relation to the transverse direction of the cable, which is perpendicular to the longitudinal direction, the cable interior is arranged inside of the cable and the sheath is on an outside of the cable.

In some favorable embodiments, the shielding layer is arranged between the outer layer and the sheath, in particular with respect to the transverse direction.

In other particularly advantageous embodiments, no shielding layer is required due to the structure of the cable interior, in particular due to the at least partially symmetrical structure of the cable interior and/or due to the fact that a further core and/or multiple further cores, in particular a protective core and/or multiple protective cores, surround the phase cores, in particular symmetrically.

In advantageous embodiments, in particular those in which no shielding layer is required, no further layer is arranged between the sheath and an outer layer, in particular in relation to the transverse direction between the sheath and an outer layer, which is perpendicular to the longitudinal direction of the cable.

In particular, in embodiments with several outer layers, no further layer is arranged between the outer layer that is furthest out, in particular with respect to the transverse direction, and the sheath, the at least one outer layer being one of the several outer layers.

In advantageous embodiments, material, in particular filling material, is arranged in at least one outer layer, in particular to fill free spaces between the cores in the at least one outer layer.

In particular, this ensures that the cable has an at least approximately circular and/or uniform shape in relation to a cross-section extending perpendicular to the longitudinal direction of the cable, which means that the cable can be sealed more reliably, for example at feed-through and/or insertion points of the cable in a control box and/or in a housing of a machine, for example.

In favorable embodiments, the filling material is an insulating material.

For example, dummy cores are provided in at least one outer layer to fill in free spaces.

In some particularly advantageous embodiments, it is provided that the sheath penetrates on the inside, in particular on the inside in relation to the transverse direction of the cable, into the outermost outer layer and at least partially fills free spaces between the cores in the outer layer, thus providing filler material in particular.

Further details on the phase cores have not yet been provided.

In particularly advantageous embodiments, it is provided that each phase line of the cable is designed for one phase of a current to be transmitted by the cable from only one phase core.

In particular, this makes it easier to install the cable, as only one phase core needs to be connected to a corresponding contact for each phase when connecting the cable.

In particular, the cable is designed for the transmission of rotary current.

It is particularly favorable if the multiple phase cores are substantially the same.

It is advantageous if the multiple phase cores comprise an at least substantially identical insulating material, which in particular forms an insulating sheath around the respective phase core.

In particular, the respective insulating sheath of a phase core surrounds the phase conductor of this phase core.

In particular, an insulating sheath forms the outside of a phase core.

Preferably, the insulating material of the insulating sheaths of the multiple phase cores comprises no or the same color pigments in each case.

In particular, the same design of the phase cores ensures that the couplings are substantially the same, for example differences in the capacitive and/or inductive coupling by using for example different color pigments are avoided, thus advantageously achieving an at least more electrically symmetrical structure and reducing interference.

In particular, the insulating material of the respective insulating sheath of a respective phase core comprises a preferably non-polar plastic, in particular the insulating material is this plastic.

In some advantageous embodiments, the plastic of the insulation material is polyethylene (PE) and/or polypropylene (PP) and/or polytetrafluoroethylene (PTFE).

One particular advantage of this is that PE and/or PP and/or PTFE have particularly good insulating properties.

In other preferred embodiments, the insulation material is a low-cost material.

For example, the plastic of the insulation material is polyvinyl chloride (PVC).

In particular, this results in cost savings and a more cost-effective insulation material can be used, as the structure of the cable reduces interference coupling through the phase conductors.

In some advantageous embodiments, it is provided that the phase bundle comprising the multiple phase cores and/or the inner layer is arranged centered inside the cable with respect to the transverse direction perpendicular to the longitudinal direction of the cable along at least approximately the entire longitudinal extent in the longitudinal direction of the cable.

For example, a cable axis and a phase bundle axis coincide at least approximately in such embodiments.

For example, this makes it possible to achieve a simple cable structure.

In other preferred embodiments, it is provided that the phase bundle comprising the multiple phase coresand/or the inner layer is arranged eccentrically inside the cable in a transverse direction perpendicular to the longitudinal direction of the cable.

In particular, the phase bundle and/or the inner layer is still the most internal element and/or the most internal layer, especially in relation to the outer layer or the multiple outer layers in the transverse direction, but is not centered, for example in relation to a cable axis, inside the cable.

In particular, a geometric axis of the phase bundle, to which it is at least approximately symmetrical, and/or a symmetric axis of the inner layer, to which it is at least approximately symmetrical, is eccentric to a geometric cable axis.

Preferably, the orientation of the eccentricity of the phase bundle and/or the inner layer changes along the longitudinal direction of the cable, in particular it rotates along the longitudinal direction, for example around the cable axis.

In some favorable embodiments, it is provided that the phase bundle and/or the inner layer is arranged to wind around a cable axis of the cable.

For example, a compact structure of the cable can be achieved in this way, whereby the eccentric arrangement of the phase bundle and/or the inner layer creates a larger free space for the arrangement of the at least one further core on an opposite side in relation to the transverse direction.

In particular, the phase bundle and the at least one further core are stranded into one another so that an at least electrically symmetrical structure is achieved inside the cable and interference coupling is preferably reduced.

No further details have yet been provided regarding at least one further core.

In particular, the at least one further core and/or one or at least some of multiple further cores in the cable is a protective core, for example an earthing core and/or an potential equalization core, which in particular comprise a protective conductor, for example for earthing or potential equalization, and preferably an insulation covering the protective conductor.

For example, the cable is designed as a hybrid line and/or collector line.

In some favorable embodiments, the at least one further core or preferably one or at least some of the multiple further cores of the cable are signal transmission cores, for example data transmission cores and/or control cores and/or resolver cores, each comprising in particular a signal transmission conductor and preferably an insulation covering the signal transmission conductor.

In some advantageous embodiments, the at least one further core and/or one or at least some of the multiple further cores are arranged as individual cores in the cable.

For example, at least one protectivecore is arranged as a single core in the cable.

In some advantageous embodiments, two further cores, in particular two signal cores, are combined to form a core pair.

In some preferred embodiments, it is provided that at least two further cores, in particular two signal cores, for example two cores of the core pair, are stranded to form a core bundle.

Preferably, the at least two cores are designed as a twisted pair.

In some preferred embodiments, at least one pair of cores and/or at least one bundle of cores is shielded, in particular in at least one outer layer, by its own shielding, in particular a metallic shielding, inside the cable interior, in particular in relation to the other cores in the cable, for example with respect to the phase cores.

In some advantageous embodiments, at least one core bundle and/or at least one core pair in at least one outer layer does not have its own shielding.

In particular, this additional shielding can be dispensed with due to the advantageous structure of the cable interior to reduce interference coupling.

In particular, the insulating material of a respective insulating sheath comprises a preferably non-polar plastic for a further core or for at least some further cores, for example for at least one protective core and/or for at least one signal transmission core, for example the plastic is the insulating material.

Advantageously, the plastic of the insulation material for the further core is polyethylene (PE) and/or polypropylene (PP) and/or polytetrafluoroethylene (PTFE).

In particularly advantageous embodiments, it is provided that the insulation material is made of a foamed material, in particular a foamed plastic, for example a foamed plastic of the aforementioned type.

In the foregoing and in the following, the term “at least substantially” in connection with a feature means in particular that technically irrelevant and/or technically related and/or minor deviations which, for example, do not significantly impair the functionality and/or advantage of the feature, are included in the term “at least substantially”.

In the foregoing and in the following, the phrase “at least approximately” in connection with an indication is to be understood in particular as meaning that this indication is to be at least substantially fulfilled and/or that deviations of up to +/−20%, preferably of up to +/−10%, for example of up to +/−5%, in particular of up to +/−1%, are included in the at least approximately given indication. For example, deviations of up to +/−15°, in particular of +/−10°, for example of up to +/−5°, are included in at least approximately specified directions.

Above and below, elements and features which are described as, for example and/or in particular and/or advantageously and/or preferably and/or the like, are optional features and/or elements which define, for example, advantageous further developments, but which are not essential and/or absolutely necessary for success according to the invention.

The above description of solutions according to the invention thus comprises in particular the various combinations of features defined by the following numbered embodiments:

1. Cable (100), in particular cable (100) for at least partial transmission of electrical energy, comprising multiple, in particular three, phase cores (142) and at least one further core (222, 264), in particular a protective core, wherein the multiple phase cores (142) are stranded to form at least one phase bundle (144) and the at least one further core (222, 264) runs outside the at least one phase bundle (144) in the cable (100).
2. Cable (100) according to embodiment 1, wherein the multiple phase cores (142) of the phase bundle (144) are arranged at least electrically symmetrically therein, in particular with respect to a phase bundle axis (162).
3. Cable (100) according to one of the preceding embodiments, wherein the multiple phase cores (142) are arranged symmetrically in the phase bundle (144) in such a way that, in a cross-section extending perpendicular to a longitudinal direction (112) of the phase bundle (144), the respective phase conductors (146) of the multiple phase cores (142) are arranged at a respective corner of an imaginary geometric equilateral polygon and, in particular, one phase conductor (146) of one of multiple phase cores (142) is arranged at each corner of the imaginary geometric equilateral polygon, geometric equilateral polygon.
4. Cable (100) according to one of the preceding embodiments, wherein the at least one further core (222, 264), in particular all further cores in the cable (100), is wound around the at least one phase bundle (144) of the multiple phase cores (142).
5. Cable (100) according to one of the preceding embodiments, wherein the at least one further core (222, 264), in particular all further cores in the cable (100), are wound, in particular stranded, around the phase bundle (144) with a direction of lay (232) opposite to the direction of lay (158) of the multiple phase cores (142) in the phase bundle (144).
6. Cable (100) according to one of the preceding embodiments, wherein an absolute value of a lay length ratio of the lay length (SP) of the multiple phase cores (142) in the phase bundle (144) to a lay length (SA) of the at least one further core (222, 264), with which the at least one further core (222, 264) is wound around the phase bundle (144), is greater than or equal to 0.1 and/or is less than or equal to 5, in particular is less than or equal to 3.
7. Cable (100), in particular cable (100) for at least partial transmission of electrical energy, comprising multiple, in particular three, phase cores (142) and at least one further core (222, 264), in particular a protective core, in particular according to one of the preceding embodiments, wherein the at least one further core (222, 264) is arranged in the cable (100) in such a way that the at least one further core (222, 264) crosses at least one of the multiple phase cores (142) at crossing points (234), in particular each of the multiple phase cores (142) at respective crossing points (234).
8. Cable (100) according to one of the preceding embodiments, wherein a crossing angle (W) with which the at least one further core (222, 264) crosses a phase core at a respective crossing point (234) is less than or equal to 65° and/or is greater than or equal to 5°.
9. Cable (100), in particular cable (100) for the at least partial transmission of electrical energy, comprising multiple, in particular three, phase cores (142) and at least one further core (222, 264), in particular a protective core, in particular according to one of the preceding embodiments, wherein the cable (100) has an inner layer (172) lying on the inside with respect to a transverse direction (114) of the cable (100) extending perpendicularly to a longitudinal direction (112) of the cable (100) and at least one outer layer (212) which is arranged further outside than the inner layer (172) with respect to the transverse direction (114), and in that the multiple phase cores (142) are arranged in the inner layer (172) and the at least one further core (222, 264) is arranged in the at least one outer layer (212).
10. Cable (100) according to one of the preceding embodiments, wherein only phase cores (142) are arranged in the inner layer (172) of the cable (100).
11. Cable (100) according to one of the preceding embodiments, wherein all phase cores (142) of the cable (100) are arranged in the inner layer (172).
12. Cable (100) according to one of the preceding embodiments, wherein the plurality of phase cores (142) are stranded in the inner layer (172) to form at least one phase bundle (144).
13. Cable (100) according to one of the preceding embodiments, wherein the inner layer (172), in particular with respect to the transverse direction (114) of the cable (100), is a layer lying furthest inwards in a cable interior (132).
14. Cable (100) according to one of the preceding embodiments, wherein additional cores (222, 264) which are not phase cores (144), in particular with respect to the transverse direction (114), are arranged outside the inner layer (172) in a cable interior (132) of the cable (100).
15. Cable (100), in particular cable (100) for the at least partial transmission of electrical energy, comprising multiple, in particular three, phase cores (142) and at least one further core (222, 264), in particular a protective core, in particular according to one of the preceding embodiments, wherein the cable (100) is designed to be at least electrically symmetrical at least with respect to a particularly capacitive and/or inductive coupling of the multiple phase cores (142) to one another, so that a particularly capacitive and/or inductive coupling between in particular two of the multiple phase cores (142) is at least approximately equal in magnitude.
16. Cable (100), in particular cable (100) for the at least partial transmission of electrical energy, comprising multiple, in particular three, phase cores (142) and at least one further core (222, 264), in particular a protective core, in particular according to one of the preceding embodiments, wherein the cable (100) is designed to be at least electrically symmetrical at least with respect to a respective in particular capacitive and/or inductive coupling of the at least one further core (222, 264) with in each case one of the multiple phase cores (142), in particular in that the in particular capacitive and/or inductive couplings between the at least one further core (222, 264) and in each case one of the multiple phase cores (142) are at least approximately equal in magnitude.
17. Cable (100) according to one of the preceding embodiments, wherein the cable (100) is designed to be symmetrically in such a way that the couplings, in particular capacitive and/or inductive couplings, between in each case one core in the inner layer (172) and one core (222, 264) in the at least one outer layer (212) are at least approximately equal in magnitude.
18. Cable (100) according to one of the preceding embodiments, wherein a separating layer (182) is arranged between the multiple phase cores (142) and the at least one further core (222, 264).

19. Cable (100) according to one of the preceding embodiments, wherein the separating layer (182) is arranged between the inner layer (172) and the outer layer (212).

20. Cable (100) according to one of the preceding embodiments, wherein the separating layer (182) is formed from a separating layer material having an effective permittivity which is less than or equal to 3, in particular less than or equal to 2.3.

21. Cable (100) according to one of the preceding embodiments, wherein the separating layer material from which the separating layer (182) is formed is a plastic.

22. Cable (100) according to one of the preceding embodiments, wherein the separating layer (182) has many air inclusions and/or the separating layer (182) is formed from a woven and/or knitted fabric and/or tape, in particular a fleece.

23. Cable (100) according to one of the preceding embodiments, wherein a thickness of the separating layer (182) measured in the transverse direction (114) extending perpendicular to the longitudinal direction (112) of the cable (100) is greater than or equal to 0.01 mm, in particular is greater than or equal to 0.02 mm and/or is less than or equal to 1.5 mm, in particular is less than or equal to 0.8 mm.

24. Cable (100), in particular cable (100) for the at least partial transmission of electrical energy, in particular according to one of the preceding embodiments, comprising multiple, in particular three, phase cores (142) and at least one shielding layer (252), wherein the cable (100) is designed to be at least electrically symmetrical at least with respect to a respective, in particular capacitive and/or inductive coupling of the at least one shielding layer (252) to in each case one of the multiple phase cores (142).

25. Cable (100) according to one of the preceding embodiments, wherein a shielding layer (252) is arranged outside the multiple phase cores (142) and the at least one further core (222, 264) around these cores (142, 222, 264), in particular around all the cores (142, 222, 264) of the cable (100), with respect to the transverse direction (114) running perpendicular to the longitudinal direction (112) of extension of the cable (100).

26. Cable (100) according to one of the preceding embodiments, wherein the cable (100) is designed to be symmetrically in such a way that at least one coupling, in particular capacitive and/or inductive coupling, between in each case one of the multiple phase cores (142) and the shielding layer (252) is approximately equal in magnitude.

27. Cable (100) according to one of the preceding embodiments, wherein the shielding layer (252) is arranged outside and around the outer layer (212) in the transverse direction (114) perpendicular to the longitudinal direction (112) of extension of the cable (100).

28. Cable (100) according to one of the preceding embodiments, wherein the cable (100) has a sheath (122) which is arranged on the outside of the cable (100) with respect to the transverse direction (114) extending perpendicularly to the longitudinal direction (112) and in particular encloses a cable interior (132) of the cable (100) and/or forms an outer side (252) of the cable (100).

29. Cable (100) according to one of the preceding embodiments, wherein no further layer is arranged between the sheath (122) and an outer layer (212), in particular with respect to the transverse direction (114) extending perpendicular to the longitudinal direction (112) of the cable (100).

30. Cable (100) according to one of the preceding embodiments, wherein additional material, in particular insulating material, is arranged in the outer layer (212) for filling free spaces between the cores (222, 264) in the outer layer (212).

31. Cable (100) according to one of the preceding embodiments, wherein the sheath (122) on the inside penetrates into the outer layer (212) and at least partially fills free spaces between the cores (222, 264) in the outer layer (212).

32. Cable (100) according to one of the preceding embodiments, wherein the multiple phase cores (142), in particular all phase cores (142), are formed substantially identically, in particular comprise an at least substantially identical insulation material, which preferably comprises no or the same color pigments in each case.

33. Cable (100) according to one of the preceding embodiments, wherein an insulating material of a respective insulating sheath (148) of a respective phase core (142) comprises one of the plastics polyethylene (PE) and/or polypropylene (PP) and/or polytetrafluoroethylene (PTFE) and/or polyvinyl chloride (PVC), in particular is one of these plastics.

34. Cable (100) according to one of the preceding embodiments, wherein each phase line for one phase in each case is formed from only one phase core (142).

35. Cable (100) according to one of the preceding embodiments, wherein the phase bundle (144), comprising the multiple phase cores (142), and/or the inner layer (172) is arranged centered in the interior (132) of the cable (100) along the at least approximately entire longitudinal extent in the longitudinal extent direction (112) of the cable (100) with respect to the transverse direction (114) extending perpendicularly to the longitudinal extent direction (112) of the cable (100).

36. Cable (100) according to one of the preceding embodiments, wherein the phase bundle (144), comprising the multiple phase cores (142), and/or the inner layer (172) is arranged eccentrically in the interior (132) of the cable (100) with respect to the transverse direction (114) extending perpendicularly to the longitudinal direction (112) of extension of the cable (100), wherein in particular the phase bundle (144) is arranged to wind around a cable axis (118) of the cable (100).

37. Cable (100) according to one of the preceding embodiments, wherein the cable (100) comprises as at least one further core (222, 264) or as multiple further cores (222, 264) at least one protective core and/or at least one data signal core.

38. Cable (100) according to one of the preceding embodiments, wherein two further cores (222, 264), in particular two signal cores, are combined to form a pair of cores and/or at least two further cores (222, 264), in particular two signal cores, are stranded to form a bundle of cores.

39. Cable (100) according to one of the preceding embodiments, wherein at least one pair of cores and/or at least one bundle of cores is shielded by its own, in particular metallic, shielding (274) within the cable interior, in particular shielded from the multiple phase cores (142).

40. Cable (100) according to one of the preceding embodiments, wherein an insulation material of a respective insulating sheath of the at least one further core (222, 264), in particular at least one protective core and/or at least one signal transmission core, comprises a plastic, wherein in particular the plastic is poly ethylene (PE) and/or polypropylene (PP) and/or polytetrafluoroethylene (PTFE), wherein in particular the insulation material comprises a foamed plastic.

Advantageous embodiments of a cable according to the invention and advantages thereof are the subject of the following detailed description and the graphic representation of two embodiments of a cable.

THE DRAWINGS SHOW

Figure 2:
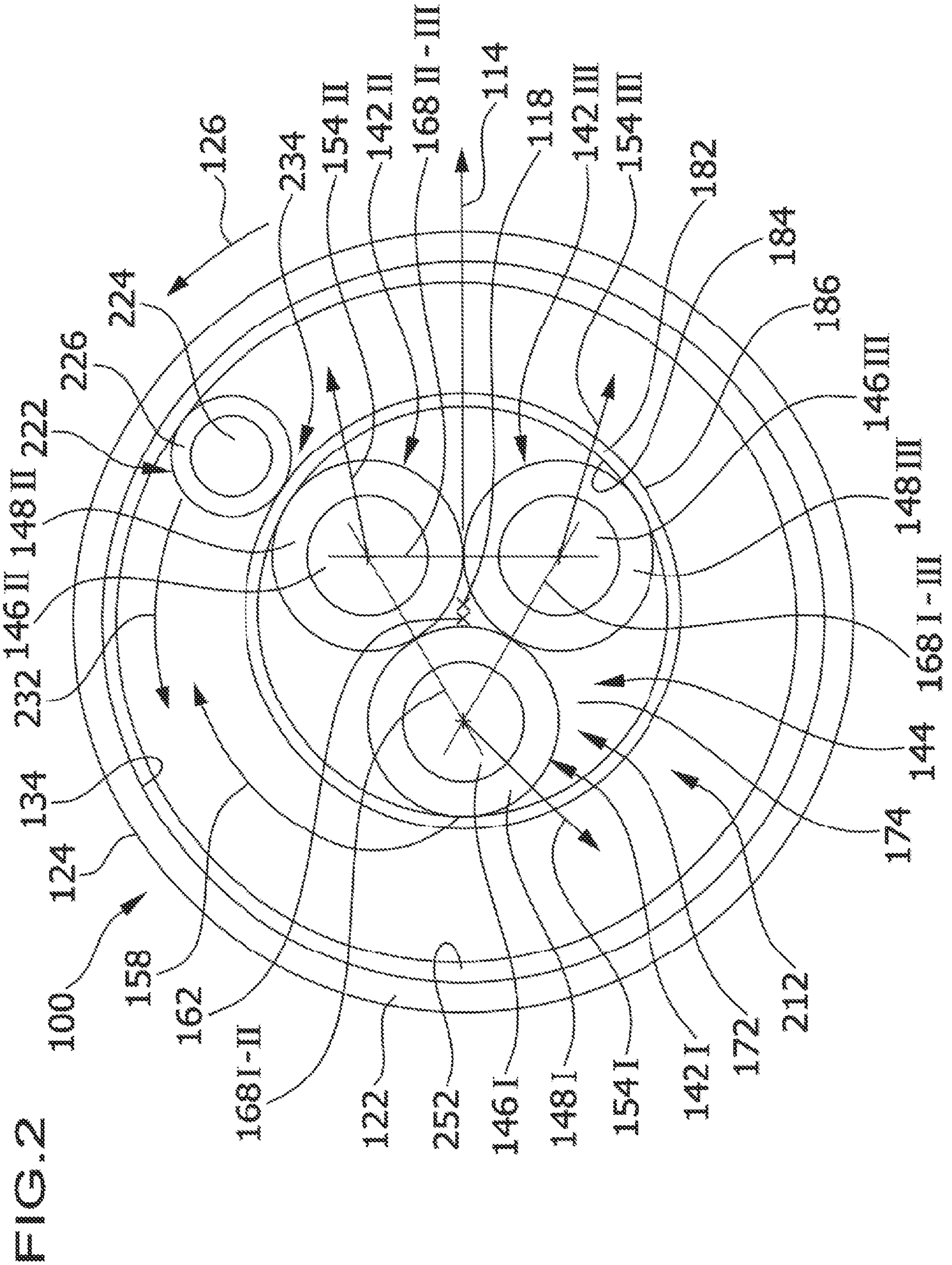
Figure 3:
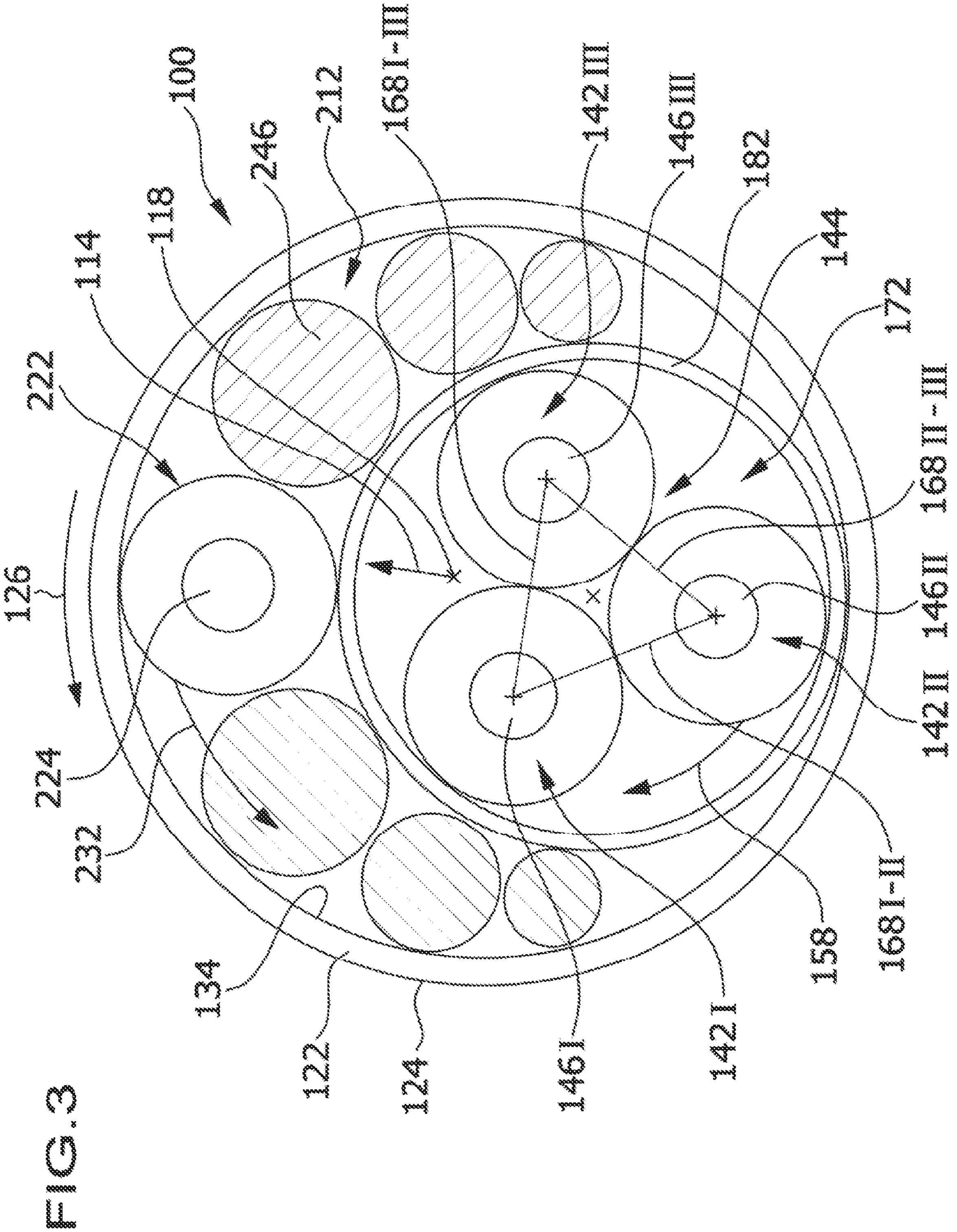
Figure 4:
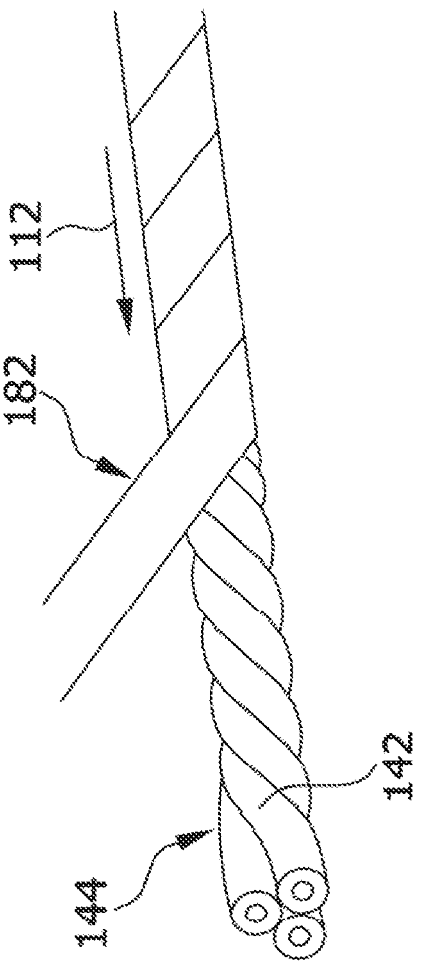
Figure 5:
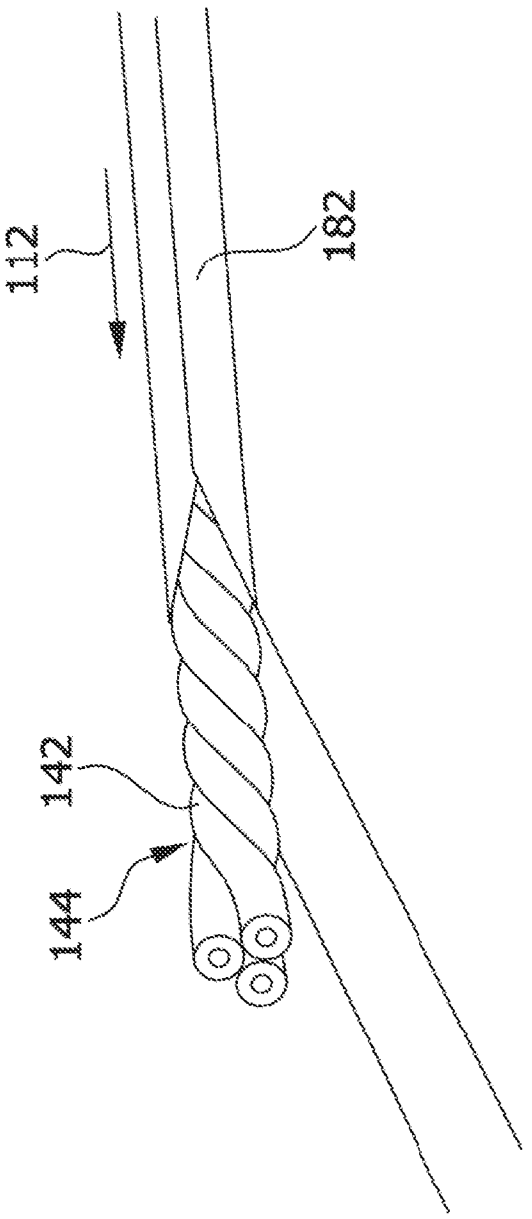
Figure 6:
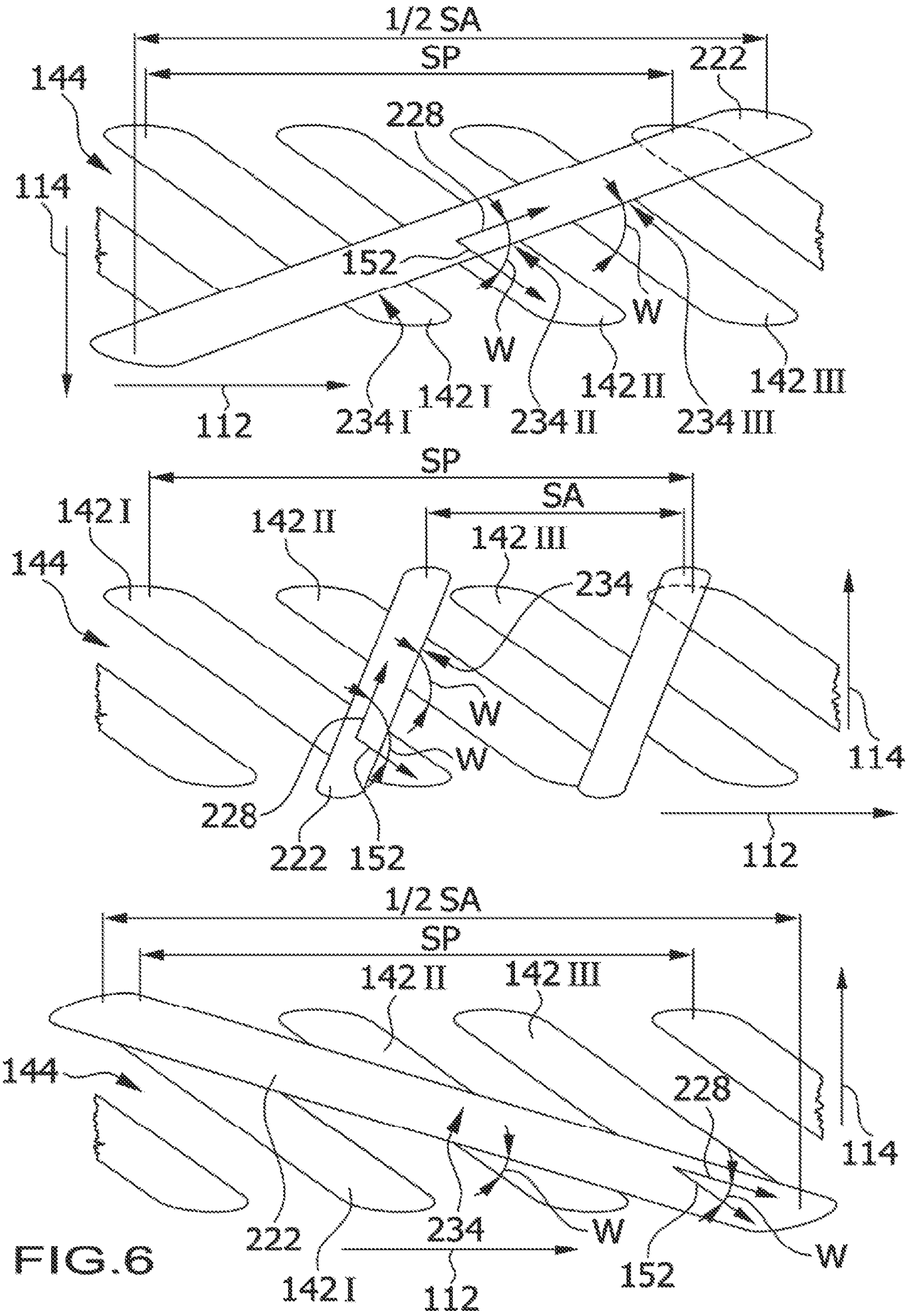
Figure 7:
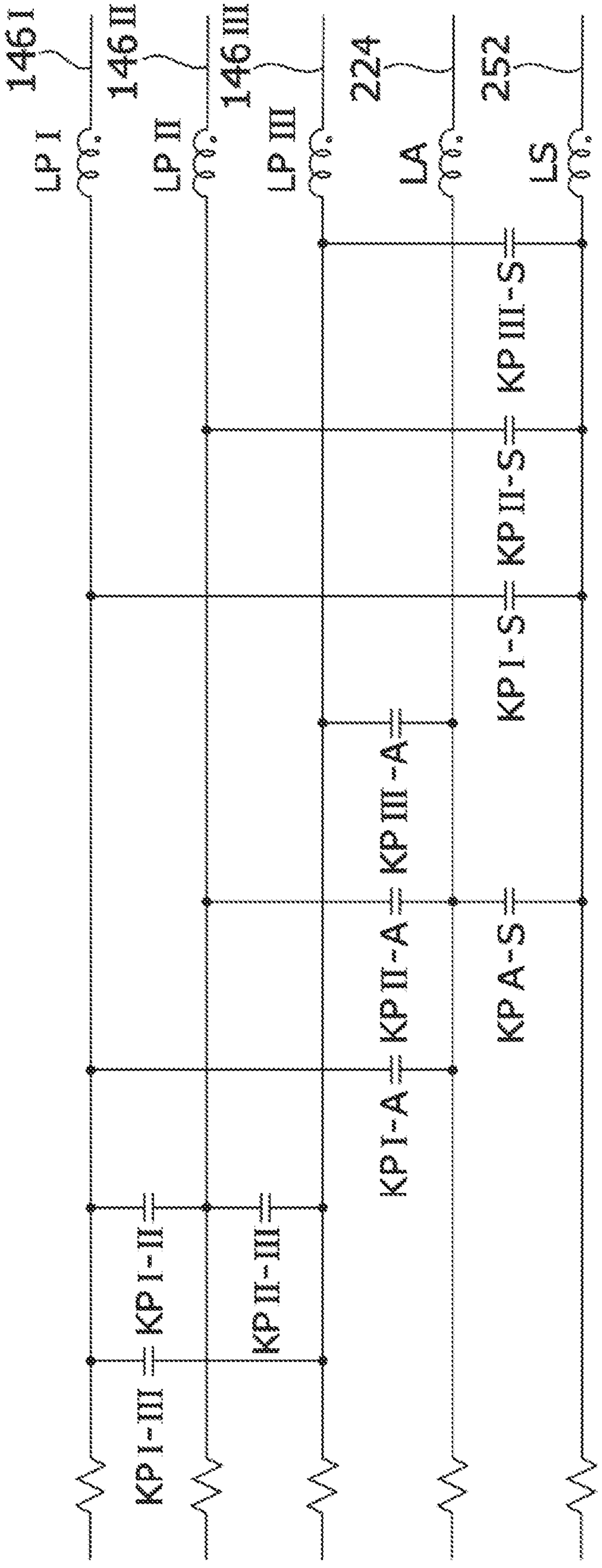
Figure 8:
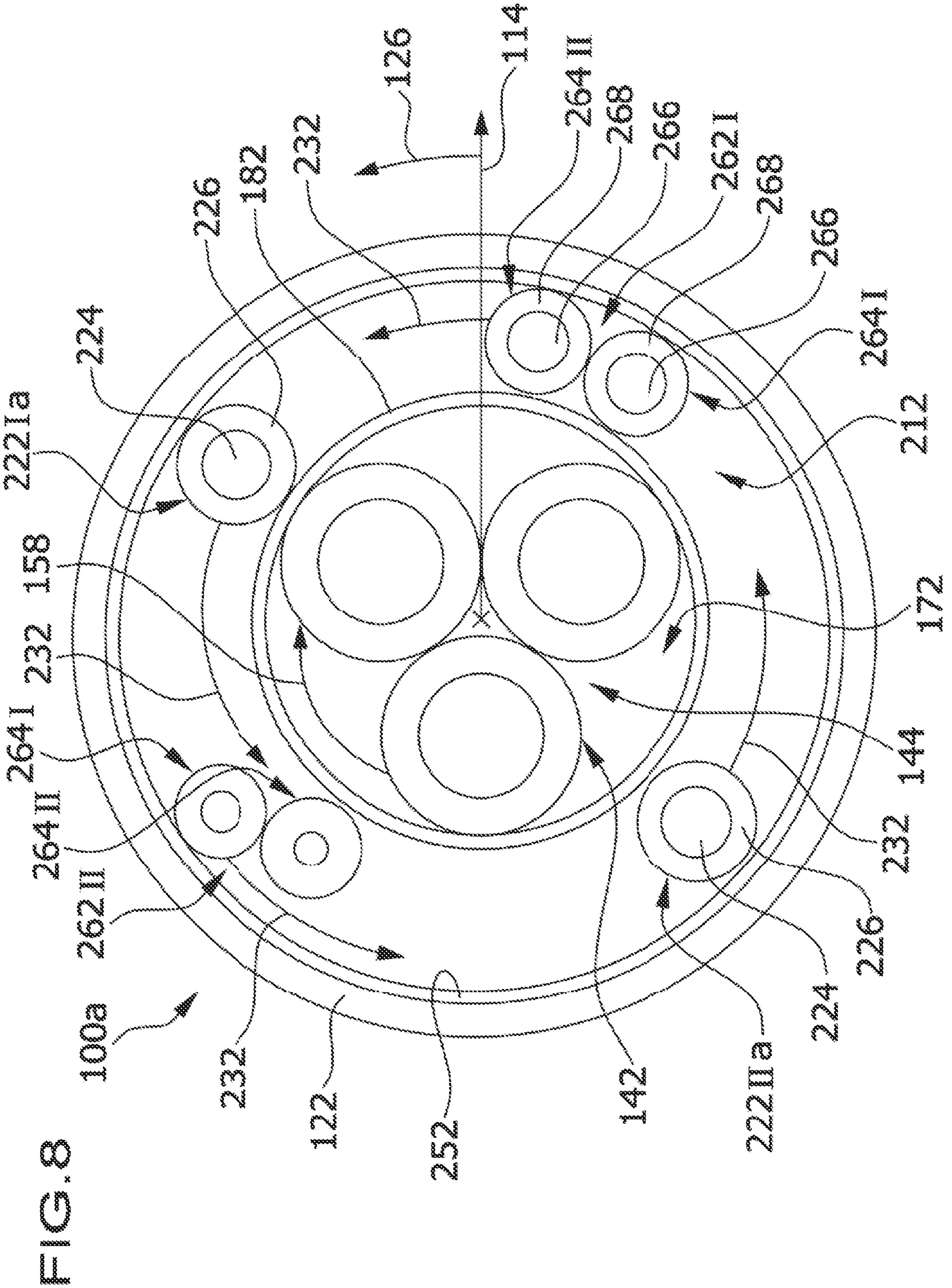
Figure 9:
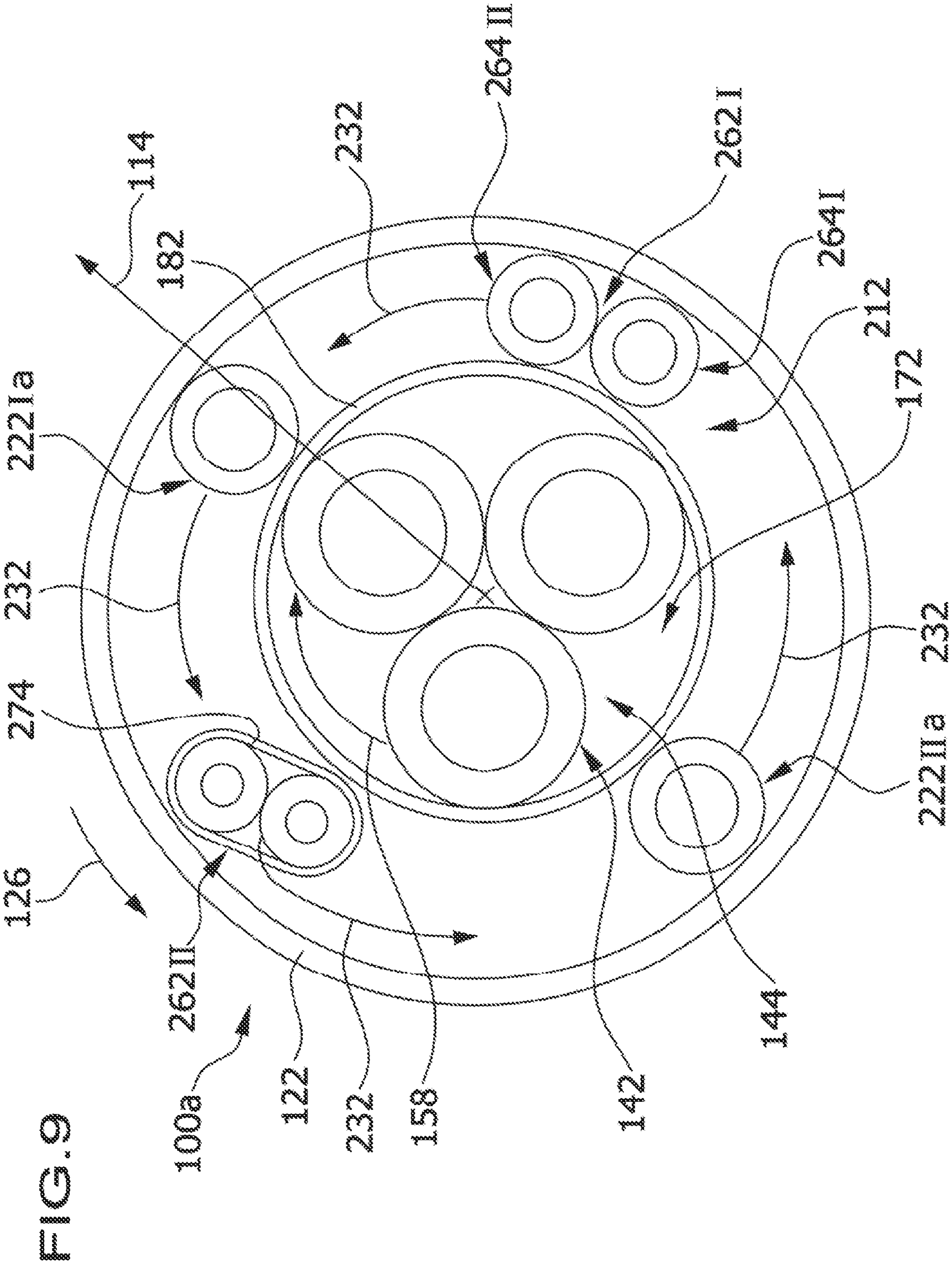

FIG. 1 a partially sectioned perspective view of a cable of a first embodiment;

FIG. 2 a cross-section of a embodiment of the first embodiment of a cable;

FIG. 3 a cross-section of another embodiment of the first embodiment of the cable;

FIG. 4 a schematic representation of a phase bundle with a transversely bandaged separating layer of an embodiment of the cable;

FIG. 5 a schematic representation of a phase bundle with a longitudinally bandaged separating layer of an embodiment of the cable;

FIG. 6 three views of embodiments of the cable with at least one further core running transverse to the phase cores;

FIG. 7 an equivalent circuit diagram for the cable;

FIG. 8 a cross-section through a embodiment of a further embodiment of a cable;

FIG. 9 a cross-section through another embodiment of the further embodiment example of a cable.

A first embodiment in different embodiments of a cable designated 100 in its entirety is explained in connection with the exemplary illustrations in FIGS. 1 to 7.

The cable 100 extends longitudinally in a longitudinal extension direction 112 and has an extension in a transverse direction 114 extending perpendicular to the longitudinal extension direction 112, wherein the extension in the transverse direction 114 is considerably smaller than the extension of the cable 100 in the longitudinal extension direction 112, as shown by way of example in FIG. 1.

In particular, when the cable 100 is elongated and straightened in the longitudinal extension direction 112, the cable 100 extends along a geometric cable axis 118, wherein in this state the longitudinal extension direction 112 of the cable 100 is oriented substantially in a constant direction along the entire longitudinal extension of the cable 100 and corresponds to an axial direction of the cable axis 118 and the transverse direction 114 corresponds to a radial direction of the cable axis 118.

The cable 100 comprises a sheath 122, which extends in the longitudinal direction 112 along the entire extension of the cable 100 and forms an outer side 124 of the cable 100 with an outer surface of the cable 100, which is directed outwards with respect to the transverse direction 114. In particular, the sheath 122 is formed closed in itself in a circumferential direction 126 and encloses an interior of the cable 100 designated as a whole by 132, wherein the cable interior 132 is bounded in the transverse direction 114 by the sheath 122, in particular by an inwardly directed inner side 134 of the sheath 122, as shown by way of example for different embodiments of the embodiment example in the cross-sectional views of FIGS. 2 and 3.

In particular, the inner side 134 of the sheath 122 and the outer side of the sheath 122 forming the outer side 124 of the cable 100 extend in the longitudinal direction 112 and are opposite each other with respect to the transverse direction 114.

In particular, the circumferential direction 126 is a direction of rotation around the geometric cable axis 118 and, locally, the transverse direction 114 is perpendicular to the circumferential direction 126.

In particular, the transverse direction 114 is directed outwardly from the cable interior 132, for example from a center thereof, in particular from the cable axis 118, toward the coating 122 and an exterior surrounding the cable 100.

The cable 100 comprises multiple phase cores 142, in particular three phase cores 142I, 142II, 142III, which are stranded to form a phase bundle 144.

Each of the phase cores 142 comprises an internal phase conductor 146, which is surrounded by an insulating sheath 148.

The insulation of the sheath 148 is formed from an insulating material, in particular from a low-cost material, in particular PVC.

The respective phase conductor 146 is formed from an electrically conductive material, in particular a metallic material, for example copper or aluminum.

Preferably, the insulating sheaths 148 of the plurality of phase cores 142, in this case in particular the insulating sheaths 148I, 148II, 148III of the three phase cores 142I, 142II, 142III, are formed from an identical material.

The phase cores 142 are designed with their respective phase conductors 146 for transmitting electrical energy, in particular for transmitting one phase of a current, with preferably exactly one phase core 142 with its phase conductor 146 being provided for each phase of the current.

This embodiment of the cable 100 is thus designed in particular for the transmission of a three-phase rotary current, for example for supplying three-phase electric motors, and in particular for use in 230 V and/or 400 V grids and in embodiments for voltages in the kV range.

Each of the phase cores 142 extends longitudinally in a respective longitudinal extension direction 152, and the respective phase conductor 146 is arranged inwardly in the phase core 142 with respect to a transverse direction 154 directed outwardly from an interior of the phase core 142 and extending perpendicularly to the longitudinal extension direction 152, and is surrounded by the insulating sheath 148.

The insulating sheath 148 of a phase core 142 forms an outer side of this phase core 142 and surrounds an interior of the phase core 142, in which the phase conductor 146 is arranged.

Since the phase cores 142 in the phase bundle 144 are stranded together with a lay direction 158, the longitudinal extension directions 152 of the phase cores 142 do not run parallel to the longitudinal extension direction 112 of the cable 100 but at an angle to it.

In particular, the phase bundle 144 extends longitudinally in a longitudinal extension direction 159 and, when elongated and straightened, along a geometric bundle axis 162, wherein in this state the longitudinal extension direction 159 of the phase bundle 144 points in a constant direction and corresponds to the axial direction of the bundle axis 162.

At least when the phase bundle 144 is elongated and straightened, the bundle axis 162 extends in the longitudinal direction 152 of the phase bundle 144 and is centered in an inner region of the phase bundle 144 with respect to a transverse direction of the phase bundle perpendicular to the longitudinal direction 152 of the phase bundle 144.

In particular, the phase cores 142 wind around the geometric bundle axis 162 in the direction of lay 158 of the phase bundle 144.

In particular, the respective longitudinal extension directions 152 of the phase cores 142 run obliquely to the longitudinal extension direction 159 of the phase bundle 144 and obliquely to a circumferential direction of the bundle axis 162 and preferably symmetrically about the bundle axis 162.

In particular, the phase cores 142 of the phase bundle 144 are arranged adjacent to one another in the bundle.

For example, the phase cores 142 in the phase bundle 144 are stranded with an S-pitch so that they wind counterclockwise with respect to an observer looking at the phase bundle 144 in the longitudinal direction of the phase bundle 144, moving away from the observer, as shown by way of example in FIGS. 1 to 3.

In embodiments of the embodiment example, the phase cores 142 in the phase bundle 144 are stranded with a Z-twist, so that the phase cores 142 wind clockwise around the bundle axis 162 away from the observer with respect to an observer looking at the phase bundle 144 in the longitudinal direction of the phase bundle 144.

A lay length SP of the phase cores 142 in the phase bundle 144, i.e. in particular a distance in the longitudinal direction 159 of the phase bundle 144 along which the phase cores 142 run once completely around the bundle axis 162, i.e. a position of the corresponding phase core 142 in the circumferential direction around the bundle axis 162 has once completely passed through an angle of 360°, is for example in a range between 10 mm and 1,000 mm.

In particular, the phase cores 142 are arranged symmetrically winding around the bundle axis 162 in the phase bundle 144.

In particular, the phase conductors 146 of the phase cores 142 are arranged at a respective corner of an imaginary, geometric equilateral polygon, in this case at corners of an equilateral triangle, and a phase conductor 146 of a phase core 142 is arranged in each corner of the geometric polygon.

Each geometric connecting line 168 between two phase conductors 146 of two adjacent phase cores 142, in this case a connecting line 168I-II between the phase conductors 146I and 146II, a connecting line 168I-III between the phase conductors 146I and 146III and a connecting line 168II-III between the phase conductors 146II and 146III, form a respective side of the equilateral polygon, in this case the equilateral triangle.

In particular, an angle between the two connecting lines 168 on a phase conductor 146 to the phase conductors 146 of the adjacent phase cores 142 is at least approximately the same size as an internal angle at a corner of a polygon which has as many corners as the phase bundle 144 has phase cores 142, in this case with three phase cores 142 the angle is at least approximately 60°.

The phase cores 142 of the phase bundle 144 form an inner layer 172 of the cable 100.

In embodiments, the inner layer 172 is arranged in particular in a central region 174 of the cable interior 132, wherein the central region 174 is arranged substantially centrally in the cable interior 132 with respect to the transverse direction 114 of the cable 100, as shown by way of example in FIG. 2.

Preferably, the inner layer 172 and thus also the phase bundle 144 is surrounded by a separating layer 182 with respect to the transverse direction 114 of the cable 100.

In particular, the separating layer 182 extends longitudinally in the longitudinal direction of extension 112 of the cable and is at least substantially closed in the circumferential direction 126.

Advantageously, the separating layer 182 surrounds the inner layer 172, wherein the inner layer 172 lies within the area circumferentially surrounded by the separating layer 182 with respect to the transverse direction 114 of the cable 100.

In particular, the separating layer 182 has an inner side 184 which is directed inwardly with respect to the transverse direction 114 and faces the inner layer 172 and extends in a closed manner in the circumferential direction 162 and extends at least approximately in the longitudinal direction 112 of the cable 100. An outer side 186 of the separating layer 182 is arranged opposite the inner side 184 of the separating layer 182 and is oriented outwardly with respect to the transverse direction 114 of the cable 100 and facing the sheath 122, wherein the outer side 186 extends in the circumferential direction 126, in particular in a closed manner, and extends at least approximately in the longitudinal direction 112 of extension of the cable 100.

The separating layer 182 is formed from a separating layer material that preferably has an effective permittivity that is less than or equal to 2.3.

In particular, the separating layer material of the separating layer 182 is a plastic and, for example, the separating layer 182 is formed from a fleece.

It is advantageous if the separating layer 182 is formed from the separating layer material in such a way that many air inclusions, i.e. in particular hollow areas filled with air, which are surrounded by the separating layer material, are formed in the separating layer 182.

In particular, the separating layer 182 is formed from a woven or knitted fabric.

For example, the separating layer 182 is formed from a tape.

In particular, the tape is made of the separating layer material and has, for example, air inclusions and/or is designed as a knitted or woven fabric.

The tape is wrapped around the phase bundle 144.

In some favorable embodiments of the embodiment example, the tape is bandaged in a transverse running-in manner, as exemplified in FIG. 4, wherein in particular the tape is wound at least substantially along its longitudinal extension in a circumferential direction around the phase bundle 144 and thus around the inner layer 172, so that a transverse extension of the tape, which is measured at least approximately perpendicular to the longitudinal extension of the tape and is considerably smaller than the longitudinal extension, is aligned at least approximately in the direction of the longitudinal extension direction 159 of the phase bundle 144.

In other favorable embodiments, the tape of the separating layer 182 is bandaged longitudinally around the phase bundle 144 and thus around the inner layer 172, as exemplified in FIG. 5, so that a longitudinal extent of the tape is aligned at least approximately in the direction of the longitudinal extent of the phase bundle 144 and with a transverse extent, which is measured at least approximately perpendicular to the longitudinal extent of the tape and is considerably smaller than the longitudinal extent of the tape, the tape is formed circumferentially surrounding the phase bundle 144 and thus also the inner layer 172.

A thickness of the separating layer 182, which is measured in particular at least substantially in the transverse direction 114 of the cable 100 and corresponds in particular to the distance between an inner surface on the inner side 184 of the separating layer 182 and an outer surface on the outer side 186 of the separating layer 182, is preferably in a range from 0.02 mm to 0.8 mm and is, for example, at least approximately 0.1 mm.

In addition, the cable interior 132 comprises an outer layer 212, which is arranged outside the inner layer 172 and inside the sheath 122 with respect to the transverse direction 117 of the cable 100.

In particular, the separating layer 182 is arranged between the inner layer 172 and the outer layer 212.

In particular, the outer layer 212 directly adjoins the separating layer 182 in the transverse direction 117 of the cable 100, so that the outer side 186 of the separating layer 182 not only faces the outer layer 212, but also delimits it on the inside with respect to the transverse direction 114 of the cable 100.

At least one further core, here for example an earthing core as a protective core 222, is arranged in the outer layer 212.

In particular, the protective core 222 comprises a protective conductor 224, which is surrounded by an insulating sheath 226 of the protective core 222. In the case of the earthing core, its protective conductor 224 is a conductor for earthing. In particular, the protective core 222 is designed to extend longitudinally in a longitudinal extension direction 228 of the protective core 222.

The protective conductor 224 and the insulating sheath 226 of the protective core 222 also extend longitudinally in the longitudinal direction of extension 228, wherein the insulating sheath 226 circumferentially surrounds the protective conductor 224 in a transverse direction perpendicular to the longitudinal direction of extension 228.

The insulation of the sheath 226 is formed from an insulating material, wherein the insulating material is in particular a preferably non-polar plastic, such as PP or PE or PTFE or also PVC.

The protective core 222 is arranged with a direction of lay 232 wound around the phase bundle 144 and thus around the phase cores 142 in the inner layer 172, for example stranded with the phase bundle 144, wherein the direction of lay 232 of the protective core 222 is oriented in the opposite direction to the lay direction 158 of the phase cores 142 in the phase bundle 144.

Thus, the protective core 222 is arranged Z-stranded if the phase cores 142 of the phase bundle 144 are S-stranded and in embodiments in which the phase cores 142 of the phase bundle 144 are Z-stranded, the protective core 222 is arranged S-stranded.

The protective core 222 is stranded with a lay length SA, in particular stranded in the opposite direction to the phase cores 142, so that the ratio of the lay lengths SV=SP/SA is negative.

For example, the lay length SA of the stranding of the protective core 222 is greater than or equal to 10 mm and/or less than or equal to 1,000 mm.

Preferably, the ratio SV=SP/SA of the lay length SP of the phase cores 142 in the phase bundle 144 to the lay length SA of the protective core 222 is greater than or equal to 0.1 and/or less than or equal to 3.

By definition, a lay length for stranding with an S lay is positive and a lay length for stranding with a Z lay is negative, although with other conventions this can also be the other way round, i.e. a lay length for stranding with an S lay is defined as negative and a lay length for stranding with a Z lay is defined as positive.

In particular, the additional core, in this case the protective core 222, thus runs transversely to the phase cores 142 with their phase conductors 146 in the phase bundle 144, as is also shown by way of example in FIG. 6 in top views of three different embodiments of the cable 100, wherein in particular only the phase cores 142 and the protective core 222 are shown in the drawing, but not, for example, the sheath 122 and the separating layer 182.

In this case, the core 222 crosses the phase cores 142 along its longitudinal extent successively at respective crossing points 234, for example the phase core 142I at crossing points 234I and at a subsequent crossing point 234II the phase core 142II and at a subsequent crossing point 234III the phase core 142III, which in turn is followed by a crossing point 234I with the phase core 142I and so on.

The crossing points 234 are related to a crossing of the cores, in this case the protective core 222 with one of the phase cores 142, in relation to the top view of the cable, as shown by way of example in FIG. 6, whereby in the exemplary cross-sectional representation of FIG. 2, the cross-section runs at a point at which a crossing point 234 of the protective core 222 with the phase core 142II is located and the exemplary cross-sectional representation in FIG. 3 is at a point at which the protective core 222 does not cross one of the phase cores 142 at any crossing point.

In particular, the further core, in this case the protective core 222, and the phase core 142 are in contact at a crossing point 234 at opposite points of the separating layer 182 with respect to the transverse direction 114 of the cable, with the phase core 142 being in contact with the inside of the separating layer 184 and the further core being in contact with the outside 186 of the separating layer 182.

In particular, the protective core 222 crosses one of the phase cores 142 at a respective crossing point 234 at a crossing angle W, which is measured in particular between the longitudinal extension direction 152 of the phase core 142 at the crossing point 234 and the longitudinal extension direction 228 of the protective core 222 at the crossing point 234.

For example, the crossing angle W is between 100 and 55°, particularly in embodiments of the embodiment example in which the protective core 222 is stranded in the opposite direction to the phase cores 142.

In the uppermost representation in FIG. 6, the lay length ratio SV=SP/SA of the lay length SP of the phase cores 142 in the phase bundle 144 to the lay length SA of the protective core 222 is less than 1 and the lay length ratio SV=SP/SA is greater than 1 in the embodiment shown in the middle representation of FIG. 6.

Finally, a embodiment of the embodiment example is shown in the lowest illustration in FIG. 6, in which the protective core 222 has a direction of lay 232 which is oriented in the same direction as the lay direction 158 of the phase cores 142 in the phase bundle 144, but the lay length SA of the protective cores 222 is different from the lay length SP of the phase cores 142 in the phase bundle 144, so that the protective core 222 also crosses the phase cores 142 at crossing points 234 at a crossing angle W.

For example, in advantageous embodiments of this embodiment example with the equally stranded protective core 222, the crossing angle W is up to 15° large for a lay length ratio SV=SP/SA, which is less than 1, and the crossing angle W is preferably at most up to 350 large for a lay length ratio SV=SP/SA, which is greater than 1.

In particular, additional filler material 242 is provided in the outer layer 212, which fills at least a large part of the space in the outer layer 212 that is not filled by the protective core 222.

The filling material 242 is shown as an example in FIG. 3, whereby a filling material is also preferably provided in embodiments as shown as an example in FIG. 2, although this is not shown in FIG. 2.

In particular, the filling material 242 is an insulating material, preferably a plastic.

For example, dummy cores 246 are arranged in the outer layer 212 and these are preferably stranded together with the protective core 222 around the inner layer 172 and thus also around the phase bundle 144, as shown by way of example in FIG. 3.

In this case, the dummy cores 246 comprise an insulating material, for example a plastic, in particular PVC, PE and/or PP, in particular as an insulating sheath, wherein the dummy cores 246 do not comprise a conductor and, in particular, the sheath thereof surrounds a cavity inside the dummy cores 246.

Alternatively or additionally, in embodiments of the embodiment example, it is provided that cords, in particular of plastic, in particular of nylon, are arranged in the outer layer 232 and are preferably stranded with the protective core 222 around the inner layer 172 and thus also around the phase bundle 144.

In yet other embodiments of the embodiment example, the filling material 242 is alternatively or additionally provided at least partially by the material of the sheath 122, wherein in particular the sheath engages at least partially into the outer layer 212 and in particular this engaging part of the sheath 122 forms at least a part of the filling material 242.

For example, this is achieved by applying increased pressure during the manufacture of the cable 100 when extruding the sheath 122, so that the increased pressure also presses the material of the sheath 122 in parts into the outer layer 212.

In particular, the sheat is extruded to fill the gusset.

In some preferred embodiments of the embodiment example, as shown by way of example in FIG. 2, it is provided that the phase bundle 144 and thus the inner layer 172 is arranged at least substantially centered in the cable interior 132 with respect to the transverse direction 114 of the cable 100, wherein in particular along the longitudinal extension in the longitudinal extension direction 112 of the cable 100 a position of the phase bundle 144 and also of the inner layer 172 in the transverse direction 114 of the cable 100 is at least substantially unchanged.

A position of the protective core 222 is different along the longitudinal extension in the longitudinal extension direction 112 of the cable 100 along the circumferential direction 126, since the protective core 222 is stranded around the inner layer 172. Thus, along the longitudinal extension of the cable 112 in the transverse direction 114, a different amount of pressure is exerted on the inner layer 172 and the phase bundle 144 from the outer layer 212 by the protective core 222 and/or the filling material 242, so that as a result the position of the inner layer 172 and the phase bundle 144 in the transverse direction 114 can vary slightly along the longitudinal extension in the longitudinal extension direction 112 of the cable 100.

In other advantageous embodiments of the embodiment example, a position of the inner layer 172 and the phase bundle 144 changes along the longitudinal extension in the longitudinal extension direction 112 of the cable 100.

In particular, in some embodiments, the phase bundle 144 and the inner layer 172 are arranged asymmetrically in the transverse direction 114 in the cable interior 132, as shown for example in FIG. 3, wherein preferably an orientation of the eccentricity along the longitudinal extent of the cable 100 changes, in particular rotates clockwise or counterclockwise according to the stranding with the protective core 222.

In particular, the inner layer 172 with the phase bundle 144 is arranged eccentrically to the cable axis 118 in such a way that at least a large part of the space of the outer layer 212 is located in a direction opposite to the direction in which the inner layer 172 is offset eccentrically to the cable axis 118 and, in particular, the protective core 222 is arranged there, whereby in particular the space of the outer layer 212 is crescent-shaped in a cross-section extending perpendicularly to the cable axis 118.

In particular, a spatial expansion of the outer layer 212 in the cross-section is greatest in a region opposite the inner layer 172 in the transverse direction 114 with respect to the cable axis 118, and the spatial expansion of the outer layer 212 decreases with the extension of the space of the outer layer 212 in the circumferential direction 126.

If, for example, the differently sized spatial portions of the outer layer 212 are to be filled with filling material 242, a plurality of dummy cores 246 of different sizes relative to their cross-section are preferably arranged in the outer layer 212.

In particular, in these embodiments of the embodiment example, the phase bundle 144 in the inner layer 172 and the protective core 222 are twisted together so that their position in the circumferential direction 126 along the longitudinal extent of the cable 100 rotates clockwise or counterclockwise depending on the direction of lay.

In some favorable embodiments, the outer layer 212 is surrounded by a shielding layer 252, which is thus arranged between the outer layer 212 and the sheath 122 with respect to the transverse direction 114 and extends in particular in the longitudinal direction 112 of extension of the cable 100 and extends in a closed manner around the outer layer 212 in the circumferential direction 126.

In particular, the shielding layer 252 is arranged adjacent to the inner side of the sheath 122, which faces the cable interior 132.

In particular, the shielding layer 252 is at least partially formed from a material suitable for electromagnetic shielding, in particular a metallic material.

For example, an at least partially metallic mesh or knitted fabric forms the shielding layer 252.

In embodiments, an at least partially metallic coating or an at least partially metallic foil, for example a metal foil or an aluminum-clad plastic foil, forms the shielding layer 252.

The shielding layer 252 is shown as an example in FIG. 2 in the embodiment with the centered inner layer 172 and the centered phase bundle 144, whereby no shielding layer 252 is provided in other favorable embodiments of this centered arrangement. Accordingly, in embodiments with the eccentric arrangement of the inner layer 172 and the phase bundle 144, no shielding layer 252 is provided in some advantageous embodiments, as shown by way of example in FIG. 3, and a corresponding shielding layer 252 is provided in other preferred embodiments.

As an example, FIG. 7 shows an equivalent circuit diagram for the cable 100 with the three phase cores 142I, 142II, 142III and the protective core 222 and the shield 252.

Two of the multiple phase conductors 146 each have a capacitive coupling KP, i.e. in particular the phase conductors 146I and 146II are coupled with a capacitive coupling KPI-II and the phase conductors 146I and 146III are coupled with a capacitive coupling KPI-III and the phase conductors 146II and 146III are coupled with a capacitive coupling KPII-III, wherein, due to the symmetrical arrangement of the phase cores 142 in the phase bundle 144, the capacitive couplings KP between each two phase conductors 146, in this case the capacitive couplings KPI-II, KPI-III and KPII-III, are at least substantially equal.

Since the protective core 222 in the outer layer 212 is arranged, in particular stranded, differently to the stranding of the phase cores 142 in the phase bundle 144, and is thus arranged symmetrically to the phase cores 142 averaged over the longitudinal extension of the cable 100 in the longitudinal extension direction 112, a capacitive coupling KPA between the protective conductor 224 and in each case one of the phase conductors 146, i.e. in particular a capacitive coupling KPI-A between the protective conductor 224 and the phase conductor 146I, a capacitive coupling KPII-A between the protective conductor 224 and the phase conductor 146II and a capacitive coupling KPIII-A between the protective conductor 224 and the phase conductor 146III, is at least substantially equal.

In particular, the capacitive couplings KPS between the shielding layer 252, if present, and one of the phase conductors 146 each, for example the capacitive coupling KPI-S between the shielding layer 252 and the phase conductor 146I, the capacitive coupling KPII-S between the shielding 252 and the phase conductor 146II and the capacitive coupling KPIII-S between the shielding 252 and the phase conductor 146III, are substantially equal in magnitude due to the symmetrical arrangement of the phase cores 142 relative to the shielding layer 252, this being particularly true both in the embodiments in which the phase bundle 144 of the phase cores 142 is arranged at least substantially centered in the cable interior 132, and also in embodiments in which the phase bundle 144 of the phase cores 142 is arranged eccentrically in the cable interior 132, at least insofar as the orientation of the eccentricity changes along the longitudinal extent of the cable 100 such that, at least in the longitudinal extent direction 112, the phase conductors 146 are arranged symmetrically with respect to the shielding direction 252 on average.

Preferably, differences between the capacitive couplings KPA, KPS of a phase conductor 146 with the protective core 222 and/or the shielding layer 252 and the capacitive couplings KPA, KPS of another phase conductor 146 with the protective core 222 and/or the shielding layer 252 are further reduced in that the phase cores 142 are at least substantially the same, in particular their materials for the respective phase conductor 146 and the respective insulating sheath 148 are the same.

In particular, an inductive coupling between the protective conductor 224 with an inductance LA and the phase conductors 146, each with an inductance LP, is at least reduced by the symmetrical structure of the cable interior 132, since the couplings of the individual phases, for example in the case of a sinusoidal, three-phase current, interfere destructively and preferably eliminate each other at least approximately as a result.

In particular, the phase conductor 146I has an inductance LPI, the phase conductor 146II has an inductance LPII and the phase conductor 146III has an inductance LPIII, these inductances preferably being at least substantially equal, In particular, an inductive coupling of the phase conductors 146 with the possibly present shielding layer 252 with an inductance LS is at least reduced by the symmetrical structure, since in turn the influences of the individual phases interfere destructively with each other and preferably at least approximately eliminate each other.

In particular, an inductive coupling between the protective conductor 224 with the inductance LA and the shielding layer 252 with the inductance LS is at least reduced by the symmetrical structure.

In particular, a structure of the cable 100, a mode of operation thereof and advantages thereof are thus briefly summarized as follows.

The cable 100 comprises a plurality of phase cores 142, in particular three phase cores 142I, 142II, 142III, each with a phase conductor 146 for transmitting one phase of an electric current, in particular a three-phase current, the phase cores 142 being arranged in the inner layer 172 and stranded to form a phase bundle 144 with a lay direction 158.

At least one further core, in this case the protective core 222 with the protective conductor 224, is arranged in the outer layer 212, wherein the at least one further core is stranded around the inner layer 172 with the phase bundle 144 with a lay direction 232, which in particular is oriented in the opposite direction to the lay direction 158 of the phase cores 142 in the phase bundle 144.

In particular, the capacitive and/or inductive coupling between the phase cores 142 and the at least one further conductor with the protective conductor 224 and, for example, with the shielding layer 252 is reduced by this symmetrical structure, which is realized in particular by the stranding in the same direction or preferably in opposite direction and/or the arrangement of all phase cores 142 in the inner layer 172, and the arrangement of the at least one further conductor in the outer layer 212.

In particular, the stranding of the at least one further core with the protective conductor 224, which may be in the same direction or preferably in the opposite direction, ensures that a respective phase core 142 and the at least one further core with the protective conductor 224 only come close to each other at the crossing points 234.

In particular, at the crossing points 234, the phase core 142 and the at least one further core are arranged in an identical position with respect to the circumferential direction 126 and only offset with respect to one another in the transverse direction 114, in particular they are located at opposite points of the separating layer 182 in the transverse direction 114, as is shown, for example, for the phase core 142II and the protective core 222 in FIG. 2, wherein in a further course of the longitudinal extension of the cable 100 the positions of these two cores in the circumferential direction 126 move away from one another as a result of the stranding and after a certain distance in the longitudinal extension direction 112 these two cores have the greatest distance from one another in a cross-section running perpendicular to the longitudinal extension direction 112, as shown for example in FIG. 3 for the phase core 142II and the protective core 222.

In particular, the coupling between the phase cores 142 on the one hand and the at least one further core with the protective conductor 224 is further reduced by the separating layer 182 arranged between the inner layer 172, in which the phase cores 142 are arranged, and the outer layer 212, in which the at least one further core is arranged.

In particular, the stranding, preferably the counter-stranding, avoids parallel conductor routing of the protective conductor 224 to the phase conductors 146, which reduces the coupling between them.

In particular, due to the arrangement of the various conductors in the cable 100 as described above and the resulting reduced coupling between them, it is sufficient to provide an inexpensive insulating material, for example PVC, for the phase cores 142 for the insulating sheath 148.

In order to avoid different couplings and to increase symmetry, it is advantageous to form the insulation of the sheath 148 from an identical material for each of the phase cores 142, for example to dispense with differently colored conductors, since different color pigments, for example, have a different, albeit possibly only slightly different, influence on the capacitive and/or inductive coupling in particular between the conductors and their conductors.

In particular, an arrangement of filling material 242 and/or of a plurality of cable elements in the outer layer 212 ensures that an outer side of the cable 100, formed in particular by the sheath 122, has an at least approximately circular shape in a cross-section extending perpendicular to the longitudinal direction 112 and, in particular, that the cable 100 is at least substantially cylindrical in shape.

In a further embodiment example, which is explained in the following, those elements and features which are at least substantially of the same design and/or fulfill at least substantially the same basic function as in the embodiment example explained above are assigned the same reference sign and, unless anything additional and/or deviating is described with regard to these features and/or elements, reference is made in full to the explanations in connection with the other embodiment example with regard to the description thereof. In particular, if special reference is to be made to a special design in the further embodiment example, a letter characterizing this embodiment example is added to the corresponding reference sign as a suffix.

A further embodiment example of a cable 100*a*, which is exemplarily shown in different embodiments in FIGS. 8 and 9, comprises a phase bundle 144, which is formed from stranded phase cores 142 and is arranged in an inner layer 172 of the cable 100*a*.

In addition, the cable 100*a* comprises an outer layer 212, which is arranged between the inner layer 172 and a sheath 122 of the cable 100*a*, in particular with respect to a transverse direction 114 of the cable 100*a*.

In this embodiment example, several cores and/or core assemblies are arranged in the outer layer 212 as additional cable elements.

In particular, the cable 100*a* thus forms a hybrid line and/or collector line and offers a "one-cable solution", for example.

For example, the cable 100*a* has two protective cores, for example two earthing cores 222Ia and 222IIa or an earthing core 222Ia and a protective core 222IIa with an equipotential bonding conductor, each of which has a protective conductor 224 and an insulating sheath 226 surrounding the protective conductor 224.

The two protective cores 222Ia, 222IIa are wound with a lay direction 232 around the phase bundle 144 and thus also into the inner layer 172, their lay direction 232 preferably being opposite to the lay direction 158 of the phase cores 142 in the phase bundle 144.

Preferably, the protective cores 222 are arranged symmetrically to one another in the outer layer 212 in such a way that, in particular in a cross-section extending perpendicularly to the cable axis 118, the protective cores 222Ia and 222IIa are arranged opposite one another with respect to a transverse direction extending perpendicularly to the longitudinal direction 112 of the cable 100*a*, which is oriented from the cable axis 118 to one of the protective cores 222, and/or, in particular, the two protective cores 222Ia and 222IIa are arranged offset from one another by half a lay length in the longitudinal direction 112 of the cable 100*a*.

In particular, the lay length of the stranding of the protective cores 222 is the same for each of the protective cores 222.

In particular, the cable 100*a* still has several cable elements in the outer layer 212, each comprising at least one core, for signal transmission.

For example, the cable 100*a* has two stranded signal bundles 262I and 262II, each consisting of two signal cores 264I and 264II, for example. Thus, two signal cores 264I and 264II are advantageously combined to form a signal pair and together form a twisted pair in particular.

Each of the signal wires 264 comprises a signal conductor 266 and an insulating sheath 268 surrounding the signal conductor 266.

In some embodiments, it is provided that one or more cable elements for signal transmission consist of only one signal core.

In particular, the cable elements for signal transmission form a data line and/or control line and/or resolver line.

In some favorable embodiments, one cable element or several cable elements still have a respective shield for their at least one core with respect to other cores in the cable, whereby, for example, the shield is made of a metallic material and/or of a fabric or knitted fabric.

For example, at least one of the two stranded signal bundles 262 comprising two cores 264 has its own pair shielding 274, as shown as an example in FIG. 9 for the stranded signal bundle 262II.

In other preferred embodiments, no separate shielding is provided for the cable elements, as shown by way of example in FIGS. 8 and 9. In particular, the cable elements are sufficiently protected from interference coupling from the other cores, especially from the phase cores 142, by the symmetrical structure of the cable 100. In this way, a considerably simplified and cost-effective design is achieved with these embodiments.

The cable elements for signal transmission, in particular the stranded signal bundles 262, are wound around the phase bundle 144 and thus also around the inner layer 172 with a lay direction 232, which is oriented in the same way as the lay direction 232 of the protective cores 222 and, for example, is opposed to the lay direction 158 of the phase cores 142 in the phase bundle 144. In particular, a lay length of the stranding around the phase bundle 144 of the cable elements for signal transmission is equal to the lay length of the stranding of the protective cores 222.

Within a stranded signal bundle 262, the several, in particular two, signal cores are stranded with a lay length which is, for example, in the range of at least approximately 20 mm up to and including 80 mm and/or is smaller than the lay length with which the stranded signal bundle 262 is wound around the phase bundle 144.

A lay direction of the stranding of the signal cores 264 in the stranded signal bundle 262 is, for example, in some embodiments oriented in the same way as the lay direction 232 with which the stranded signal bundle 262 is stranded around the phase bundle 144.

In other embodiments of the embodiment example, the lay direction with which the signal cores 264 are stranded in the stranded signal bundle 262 is oriented in the opposite direction to the lay direction 232 with which the stranded signal bundle 262 is stranded around the phase bundle 144.

Thus, the alignment of the signal cores 264 to the preferably symmetrical phase bundle 144 with the multiple phase wires always changes along the longitudinal extent of the stranded signal bundle 262, so that a magnetic interference coupling from the electric current in the phase cores into the signal cores is advantageously at least reduced by destructive interference.

Preferably, the cable elements for signal transmission, for example the stranded signal bundles 262I and 262II, are arranged symmetrically, in particular with respect to the cable axis 118, so that, for example, the stranded signal bundles 262I and 262II are arranged opposite one another in a cross-section running perpendicular to the cable axis in a transverse direction running perpendicular to the longitudinal extension direction 112 and oriented from the cable axis 118 to one of the stranded signal bundles 262.

Preferably, the cable elements for signal transmission, in particular the stranded signal bundles 262, and the protective cores 222 are arranged symmetrically to one another in the outer layer 212.

In particular, for example in relation to a cross-section through the cable 100*a* extending perpendicularly to the cable axis 118, a cable element for signal transmission and a protective core are each arranged alternately in succession in the outer layer 212 in the circumferential direction 126.

In particular, the cable elements of the outer layer 212, here in particular the protective cores and cable elements for signal transmission, are each arranged offset from one another by an offset distance in the longitudinal extension direction 112 of the cable 100*a*, the offset distance in particular corresponding to the lay length with which these are wound around the phase bundle 144, divided by the total number of cable elements in the outer layer 212. In this embodiment example, the four cable elements, in particular a protective core to an adjacent cable element for signal transmission, are thus arranged offset from one another in the longitudinal direction 112 of extension of the cable 100*a* with an offset distance corresponding to a quarter of the lay length 232.

In some favorable embodiments of the embodiment example, a shielding layer 252 is arranged between the outer layer 212 and the sheath 122, in particular as described in connection with the embodiment example explained above, as shown by way of example in FIG. 8. In particular, the shielding layer 252 provides additional shielding of the cable interior 132 from an environment of the cable 100*a*.

In some advantageous embodiments of the embodiment example, no shielding layer is arranged between the outer layer 212 and the sheath 122 of the cable 100*a*, as shown by way of example in FIG. 9. In particular, no shielding layer is required, since the preferably symmetrical structure of the cable 100*a* achieves sufficiently good electromagnetic compatibility and interference couplings can be sufficiently avoided.

Otherwise, the embodiments of this embodiment example are preferably at least partially, for example at least substantially, formed in the same way as in the first embodiment example, so that with regard to supplementary explanations, in particular with regard to the structure of the cable 100*a* and/or the cores and/or the inner layer and outer layer and/or a separating layer 182 between the inner layer 172 and the outer layer 212 and/or the sheath 122 and/or further advantageous embodiments, reference is made in full to the explanations in connection with the first embodiment example.

100*a*100*a*

REFERENCE LIST

100 Cable
112 Longitudinal direction of the cable
114 Transverse direction of the cable
118 Cable axis
122 Coating
124 Outer side
126 Circumferential direction
132 Cable interior
134 Inner side of the coating
142 Phase core
144 Phase bundle
146 Phase conductor
148 Insulating sheath
152 Longitudinal extension direction of the phase core
154 Transverse direction of the phase core
158 Direction of lay of the phase bundle
159 Longitudinal direction of the phase bundle
162 Bundle axis
166 Connection line
172 Inner layer
174 Central region
182 Separating layer
184 Inner side of the separating layer
186 Outer side of the separating layer
212 Outer layer
222 Protective core
224 Protective conductor
226 Insulating sheath
228 Longitudinal direction
232 Direction of lay
234 Crossing point
242 Filling material
246 Blind core
252 Shielding layer
262 Signal stranding system
264 Signal wire
266 Signal conductor
268 Insulation of the sheathing
274 Own shielding

The invention claimed is:

1. A cable for at least partial transmission of electrical energy, comprising:

multiple phase cores that are stranded to form a phase bundle, the phase bundle being electrically arranged with respect to a central longitudinal axis of the cable;

at least one further core running outside the phase bundle in the cable, the at least one further core and any further cores of the at least one further core in the cable are wound around the phase bundle with a direction of lay opposite to the direction of lay of the multiple phase cores in the phase bundle;

wherein the cable is designed to be at least electrically symmetrical at least with respect to a respective capacitive and/or inductive coupling of the at least one further core with in each case one of the multiple phase cores, in that the capacitive and/or inductive couplings between the at least one further core and in each case one of the multiple phase cores are at least approximately equal in magnitude; and an inner layer arranged eccentrically in the interior of the cable with respect to the central longitudinal axis of the cable, wherein the phase bundle is disposed in the inner layer, and wherein the phase bundle is arranged to move around the central longitudinal axis of the cable such that an orientation of the eccentricity of the phase bo dle changes with respect to the central longitudinal axis of the cable along a longitudinal extension of the cable.

2. The cable according to claim 1, wherein the multiple phase cores of the phase bundle are arranged at least electrically symmetrically therein; and/or, the cable is designed to be at least electrically symmetrical at least with respect to a capacitive and/or inductive coupling of the multiple phase cores to one another, so that a particularly capacitive and/or inductive coupling between two of the multiple phase cores is at least approximately equal in magnitude; and/or, the cable is designed to be symmetrically in such a way that the capacitive and/or inductive couplings, between in each case one core in an inner layer and one core in the at least one outer layer are at least approximately equal in magnitude.

3. The cable according to claim 1, wherein the multiple phase cores are arranged symmetrically in the phase bundle in such a way that, in a cross-section extending perpendicular to a longitudinal direction of the phase bundle, respective phase conductors of the multiple phase cores are arranged at a respective corner of an imaginary geometric equilateral polygon and, wherein one phase conductor of one of multiple phase cores is arranged at each corner of the imaginary geometric equilateral polygon.

4. The cable according to claim 1, wherein an absolute value of a lay length ratio of the lay length (SP) of the multiple phase cores in the phase bundle to a lay length (SA) of the at least one further core, with which the at least one further core is wound around the phase bundle, is greater than or equal to 0.1 and/or is less than or equal to 5.

5. The cable according to claim 1, wherein the at least one further core is arranged in the cable in such a way that the at least one further core crosses at least one of the multiple phase cores at crossing points; and/or, a crossing angle (W) with which the at least one further core crosses at least one of the multiphase cores at a respective crossing point is less than or equal to 65° and/or is greater than or equal to 5°.

6. The cable according to claim 1, wherein the inner layer lies on the inside with respect to a transverse direction of the cable extending perpendicularly to a longitudinal direction of the cable and at least one outer layer which is arranged further outside than the inner layer with respect to the transverse direction, and in that the multiple phase cores are arranged in the inner layer and the at least one further core is arranged in the at least one outer layer; and/or, only the multiphase phase cores are arranged in the inner layer of the cable; and/or, all of the multiphase phase cores of the cable are arranged in the inner layer; and/or, the multiple phase cores are stranded in the inner layer to form at least one of the at least one phase bundles in the cable; and/or, the inner layer is a layer lying furthest inwards in a cable interior; and/or, additional cores which are not phase cores with respect to the transverse direction, are arranged outside the inner layer in the cable interior of the cable.

7. The cable according to claim 1, wherein a separating layer is arranged between the multiple phase cores and the at least one further core; and/or, the separating layer is arranged between an inner layer and an outer layer; and/or, the separating layer is formed from a separating layer material having an effective permittivity which is less than or equal to 3; and/or, the separating layer material from which the separating layer is formed is a plastic; and/or, the separating layer has many air inclusions and/or the separating layer is formed from a woven and/or knitted fabric and/or tape; and/or, a thickness of the separating layer measured in the transverse direction extending perpendicular to the longitudinal direction of the cable is greater than or equal to 0.01 mm, and/or is less than or equal to 1.5 mm.

8. The cable according to claim 1, comprising the multiple phase cores and at least one shielding layer, wherein the cable is designed to be at least electrically symmetrical at least with respect to a respective capacitive and/or inductive coupling of the at least one shielding layer to in each case one of the multiple phase cores; and/or, at least one shielding layer is arranged outside the multiple phase cores and the at least one further core around all the cores of the cable with respect to the transverse direction running perpendicular to the longitudinal direction of extension of the cable; and/or, the cable is designed to be symmetrically in such a way that the capacitive and/or inductive coupling between in each case one of the multiple phase cores and the shielding layer is approximately equal in magnitude; and/or, the shielding layer is arranged outside and around the outer layer in the transverse direction perpendicular to the longitudinal direction of extension of the cable.

9. The cable according to claim 1, wherein the cable has a sheath which is arranged on the outside of the cable with respect to the transverse direction extending perpendicularly to the longitudinal direction; and/or, no further layer is arranged between the sheath and an outer layer with respect to the transverse direction extending perpendicular to the longitudinal direction of the cable; and/or, additional material is arranged in the outer layer for filling free spaces between the cores in the outer layer; and/or, the sheath on the inside penetrates into the outer layer and at least partially fills free spaces between the cores in the outer layer.

10. The cable according to claim 1, wherein the multiple phase cores are formed substantially identically comprise a substantially identical insulation material;

and/or, an insulating material of a respective insulating sheath of a respective phase core comprises one of the plastics polyethylene (PE) and/or polypropylene (PP) and/or polytetrafluoroethylene (PTFE) and/or polyvinyl chloride (PVC).

11. The cable according to claim 1, wherein a phase line is provided for each phase of a current to be transmitted by the cable by only one phase core of the multiphase phase cores.

12. The cable according to claim 1, wherein the cable comprises as at least one further core or as multiple further cores at least one protective core and/or at least one data signal core.

13. The cable according to claim 1, wherein the at least one further core comprises two further cores, wherein the two further cores are two signal cores, and are combined to form a pair of cores and/or the two signal cores are stranded to form a bundle of cores; and/or, wherein the at least one further core comprises at least one pair of cores and/or wherein the at least one further core comprises at least one bundle of cores is shielded by its own metallic, shielding within the cable interior shielded from the multiple phase cores; and/or, an insulation material of a respective insulating sheath of the at least one further core, which is at least one protective core and/or at least one signal transmission core, comprises a plastic, wherein the insulation material comprises a foamed plastic.

* * * * *